(12) United States Patent
Fåhraeus et al.

(10) Patent No.: US 9,442,574 B2
(45) Date of Patent: *Sep. 13, 2016

(54) TOUCH SENSING APPARATUS AND METHOD OF OPERATING THE SAME

(71) Applicant: FlatFrog Laboratories AB, Lund (SE)

(72) Inventors: Christer Fåhraeus, Bjarred (SE); Henrik Wall, Dalby (SE); Ola Wassvik, Brosarp (SE); Tomas Christiansson, Torna-Hallestad (SE)

(73) Assignee: FLATFROG LABORATORIES AB, Lund (SE)

( * ) Notice: Subject to any disclaimer, the term of this patent is extended or adjusted under 35 U.S.C. 154(b) by 193 days.

This patent is subject to a terminal disclaimer.

(21) Appl. No.: 14/052,101

(22) Filed: Oct. 11, 2013

(65) Prior Publication Data

US 2014/0125633 A1    May 8, 2014

Related U.S. Application Data

(63) Continuation of application No. 12/998,771, filed as application No. PCT/SE2009/051364 on Dec. 2, 2009, now Pat. No. 8,581,884.

(60) Provisional application No. 61/193,526, filed on Dec. 5, 2008, provisional application No. 61/193,929, filed on Jan. 9, 2009.

(30) Foreign Application Priority Data

Dec. 5, 2008 (SE) .................................... 0802531-4

(51) Int. Cl.
*G06F 3/03* (2006.01)
*G06F 3/042* (2006.01)

(52) U.S. Cl.
CPC ........... *G06F 3/0325* (2013.01); *G06F 3/0421* (2013.01); *G06F 3/0428* (2013.01); *G06F 2203/04109* (2013.01)

(58) Field of Classification Search
None
See application file for complete search history.

(56) References Cited

U.S. PATENT DOCUMENTS

| | | |
|---|---|---|
| 3,673,327 A | 6/1972 | Johnson et al. |
| 5,577,501 A | 11/1996 | Flohr et al. |

(Continued)

FOREIGN PATENT DOCUMENTS

| | | | | |
|---|---|---|---|---|
| DK | WO2007/112742 | * 10/2007 | ............. | G06F 3/048 |
| JP | 2008-506173 A | 2/2008 | | |

(Continued)

OTHER PUBLICATIONS

R.C. Bose, "Strongly Regular Graphs, Partial Geometries and Partially Balanced Designs," Pacific J. Math., vol. 13, No. 2, pp. 389-419; Apr. 1963.

(Continued)

*Primary Examiner* — Quan-Zhen Wang
*Assistant Examiner* — Chad Dicke
(74) *Attorney, Agent, or Firm* — Harness, Dickey & Pierce, P.L.C.

(57) ABSTRACT

A touch sensing apparatus includes a group of emitters arranged to emit light to illuminate at least part of the touch surface, a light detector arranged to receive light from the group of emitters, and a processing element. Each emitter is controlled to transmit a code by way of the emitted light such that the code identifies the respective emitter. The codes may at least partly be transmitted concurrently. The codes may be selected such that a value of an autocorrelation of each code is significantly higher than a value of a cross-correlation between any two codes of different emitters. The processing element processes an output signal from the light detector to separate the light received from the individual emitters based on the transmitted codes, and to determine the position of the object/objects based on the light received from the individual emitters.

15 Claims, 10 Drawing Sheets

(56) References Cited

U.S. PATENT DOCUMENTS

| | | | |
|---|---|---|---|
| 5,740,224 | A | 4/1998 | Muller et al. |
| 5,767,517 | A | 6/1998 | Hawkins |
| 6,940,286 | B2 | 9/2005 | Wang et al. |
| 6,965,836 | B2 | 11/2005 | Richardson |
| 7,705,835 | B2 | 4/2010 | Eikman |
| 8,149,211 | B2 | 4/2012 | Hayakawa et al. |
| 2002/0075243 | A1 | 6/2002 | Newton |
| 2002/0130883 | A1* | 9/2002 | Huang et al. ............... 345/589 |
| 2004/0130338 | A1 | 7/2004 | Wang et al. |
| 2004/0252091 | A1* | 12/2004 | Ma et al. ...................... 345/87 |
| 2006/0227120 | A1 | 10/2006 | Eikman |
| 2008/0006766 | A1 | 1/2008 | Oon et al. |
| 2008/0238433 | A1 | 10/2008 | Joutsenoja et al. |
| 2009/0127005 | A1* | 5/2009 | Zachut et al. ............ 178/18.03 |
| 2009/0153519 | A1 | 6/2009 | Suarez Rovere |
| 2010/0059295 | A1* | 3/2010 | Hotelling et al. ........ 178/18.06 |
| 2010/0060896 | A1 | 3/2010 | Van De Wijdeven et al. |
| 2010/0142823 | A1 | 6/2010 | Wang et al. |
| 2010/0176732 | A1* | 7/2010 | Schenk et al. ............... 315/152 |
| 2010/0328265 | A1* | 12/2010 | Hotelling et al. ........... 345/174 |
| 2011/0147569 | A1 | 6/2011 | Drumm |
| 2011/0157095 | A1 | 6/2011 | Drumm |
| 2011/0157096 | A1 | 6/2011 | Drumm |

FOREIGN PATENT DOCUMENTS

| | | |
|---|---|---|
| JP | 2009-543173 | 12/2009 |
| WO | WO-02/07072 A2 | 1/2002 |
| WO | WO-2005/026938 A2 | 3/2005 |
| WO | WO-2006003245 A1 | 1/2006 |
| WO | WO-2006/095320 A2 | 9/2006 |
| WO | WO-2007112742 A1 | 10/2007 |
| WO | WO-2008007276 A2 | 1/2008 |
| WO | WO-2009077962 A2 | 6/2009 |
| WO | WO-2010/006883 A2 | 1/2010 |

OTHER PUBLICATIONS

Frank Natterer, "The Mathematics of Computerized Tomography," Society for Industrial and Applied Mathematics, 222 pages; Jul. 2001.

Maximilian Karl: "Entwicklung and Bau einer neuartigen Mehrfinger-Touchscreen basierend auf frustrierter Totalreflexion," Landeswettbewerb in Bayern 2008 Jugend Forscht, Apr. 1, 2008.

European Search Report dated Apr. 19, 2012 issued in European Application No. 09830665.7.

Japanese Office Action issued in Japanese Patent Applicaiton No. 2011-539479, dated Feb. 25, 2014.

Christer Ericson, "Real-Time Collision Detection", The Morgan Kaufmann Series in Interactive 3D Technology (2005) Chapters 5-9, pp. 125-412.

Joseph O'Rourke, "Computational Geometry in C", Second Edition, Cambridge University Press, (1998). pages 252-264.

Kak et al., "Principles of Computerized Tomographic Imaging", (1999), The Institute of Electrical Engineers, Inc.

Natterer, et al., "Mathematical Methods in Image Reconstruction", Society for Industrial and Applied Mathematics, 12001J.

IBM TDB 09-85, "Enhanced Optical Touch Input Panel", p. 1760-1762, Sep. 1985.

Press, et al., "Numerical Recipes The Art of Scientific Computing", Third Edition, Cambridge University Press, 2007, pp. 1-1235.

Barzilai et al., "Two-Point Step Size Gradient Methods", IMA Journal of Numerical Analysis, 1988, pp. 141-148.

Karsten Fourmont, Non-Equispaced Fast Fourier Transforms with Applications to Tomography, The Journal of Fourier Analysis and Applications, vol. 9, Issue 5, 2003, pp. 431-450.

* cited by examiner

TOUCH SENSING APPARATUS AND METHOD OF OPERATING THE SAME

CROSS-REFERENCE TO RELATED APPLICATIONS

The present application is a Continuation of U.S. application Ser. No. 12/998,771 filed on May 31, 2011, which is a National Stage Application of Application No. PCT/SE2009/051364 filed on Dec. 2, 2009, which claims priority to Swedish patent application No. 0802531-4 filed on Dec. 5, 2008 and U.S. Provisional Application No. 61/193,929 filed on Jan. 9, 2009 and U.S. Provisional Application No. 61/193,526 filed Dec. 5, 2008, the contents of all of which are incorporated herein by reference in their entirety.

TECHNICAL FIELD

The present invention relates to techniques for determining the location of one or more of objects on a touch surface.

BACKGROUND

To an increasing extent, touch-sensitive panels are being used for providing input data to computers, electronic measurement and test equipment, gaming devices, etc.

In one category of touch-sensitive panels, known from e.g. U.S. Pat. No. 3,673,327, a plurality of optical emitters and optical receivers are arranged around the periphery of a touch surface to create a grid of intersecting light paths above the touch surface. Each light path extends between a respective emitter/receiver pair. An object that touches the touch surface will block certain ones of the light paths. Based on the identity of the receivers detecting a blocked light path, a processor can determine the location of the intercept between the blocked light paths. This type of system is only capable of detecting the location of one object (single-touch detection). Further, the required number of emitters and receivers, and thus cost and complexity, increases rapidly with increasing surface area and/or spatial resolution of the touch panel.

In a variant, e.g. shown in WO2006/095320, each optical emitter emits a beam of light that diverges across the touch surface, and each beam is detected by more than one optical receiver positioned around the periphery of the touch surface. Thus, each emitter creates more than one light path across the touch surface. A large number of light paths are created by sequentially activating different emitters around the periphery of the touch surface, and detecting the light received from each emitter by a plurality of optical receivers. Thereby, it is possible to reduce the number of emitters and receivers for a given surface area or spatial resolution, or to enable simultaneous location detection of more than one touching object (multi-touch detection). However, this is achieved at the cost of a reduced temporal resolution, since the emitters are activated in sequence. This may be a particular drawback when the number of emitters is large. To increase the temporal resolution, each emitter may be activated during a shortened time period. However, this may result in a significant decrease in signal-to-noise ratio (SNR).

SUMMARY

It is an object of the invention to at least partly overcome one or more of the above-identified limitations of the prior art.

This and other objects, which will appear from the description below, are at least partly achieved by means of a touch sensing apparatus, a method of operating a touch sensing apparatus and a computer-readable medium according to the independent claims, embodiments thereof being defined by the dependent claims.

According to a first aspect, there is provided a touch sensing apparatus, comprising: a touch surface; a group of emitters arranged to emit light to illuminate at least part of the touch surface; a light detector arranged to receive light from the group of emitters; and a processing element configured to process an output signal from the light detector to determine the position of one or more objects interacting with the touch surface; wherein each emitter is controlled to transmit a code by way of the emitted light such that the code identifies the respective emitter, and wherein the processing element is configured to separate the light received from individual emitters based on the transmitted codes.

According to a second aspect, there is provided a method of operating a touch sensing apparatus, which comprises a touch surface, a group of emitters arranged to emit light to illuminate at least part of the touch surface, and a light detector arranged to receive light from the group of emitters, said method comprising: controlling each emitter to transmit a code by way of the emitted light such that the code identifies the respective emitter; processing an output signal from the light detector to separate the light received from the individual emitters based on the transmitted codes; and determining the position of one or more objects interacting with the touch surface based on the light received from the individual emitters.

According to a third aspect, there is provided a computer-readable medium storing processing instructions that, when executed by a processor, performs the method according to the second aspect.

It is also an objective to provide an alternative to the touch sensing techniques of the prior art, and in particular a touch sensing technique that is capable of accurately determining a touch location irrespective of the shape of the touching object. This objective is at least partly achieved by means of a further inventive concept.

According to a first aspect of the further inventive concept, there is provided a touch sensing apparatus, comprising: a light transmissive element that defines a touch surface; a set of emitters arranged around the periphery of the touch surface to emit beams of light into the light transmissive element, wherein the beams of light propagate inside the light transmissive element while illuminating the touch surface such that an object touching the touch surface causes an attenuation of the propagating light, wherein each beam of light diverges in the plane of the touch surface as the beam propagates through the light transmissive element; a set of light detectors arranged around the periphery of the touch surface to receive light from the set of emitters on a plurality of light paths, wherein each light detector is arranged to receive light from more than one emitter; and a processing element configured to determine, based on output signals of the light detectors, a light energy value for each light path; to generate a transmission value for each light path based on the light energy value; and to operate an image reconstruction algorithm on at least part of the thus-generated transmission values so as to determine the position of the object on the touch surface.

According to a second aspect of the further inventive concept, there is provided a method in a touch sensing apparatus. The touch sensing apparatus comprises a light transmissive element that defines a touch surface, a set of emitters arranged around the periphery of the touch surface to emit beams of light into the light transmissive element, wherein the beams of light propagate inside the light transmissive element while illuminating the touch surface such that an object touching the touch surface causes an attenuation of the propagating light, and wherein each beam of light diverges in the plane of the touch surface as the beam propagates through the light transmissive element, said apparatus further comprising a set of light detectors arranged around the periphery of the touch surface to receive light from the set of emitters on a plurality of light paths and generate a set of output signals that represents the light energy received by each detector, wherein each light detector is arranged to receive light from more than one emitter. The method comprises the steps of: determining, based on the set of output signals, a light energy value for each light path; generating a transmission value for each light path by dividing the light energy value by a background value; and operating an image reconstruction algorithm on at least part of the thus-generated transmission values so as to determine the position of the object on the touch surface.

According to a third aspect of the further inventive concept, there is provided a computer-readable medium storing processing instructions that, when executed by a processor, performs the method according to the second aspect.

Still other objectives, features, aspects and advantages of the present invention will appear from the following detailed description, from the attached claims as well as from the drawings.

BRIEF DESCRIPTION OF THE DRAWINGS

Example embodiments of the invention will now be described in more detail with reference to the accompanying schematic drawings.

DETAILED DESCRIPTION OF EXAMPLE EMBODIMENTS

Figure 1:
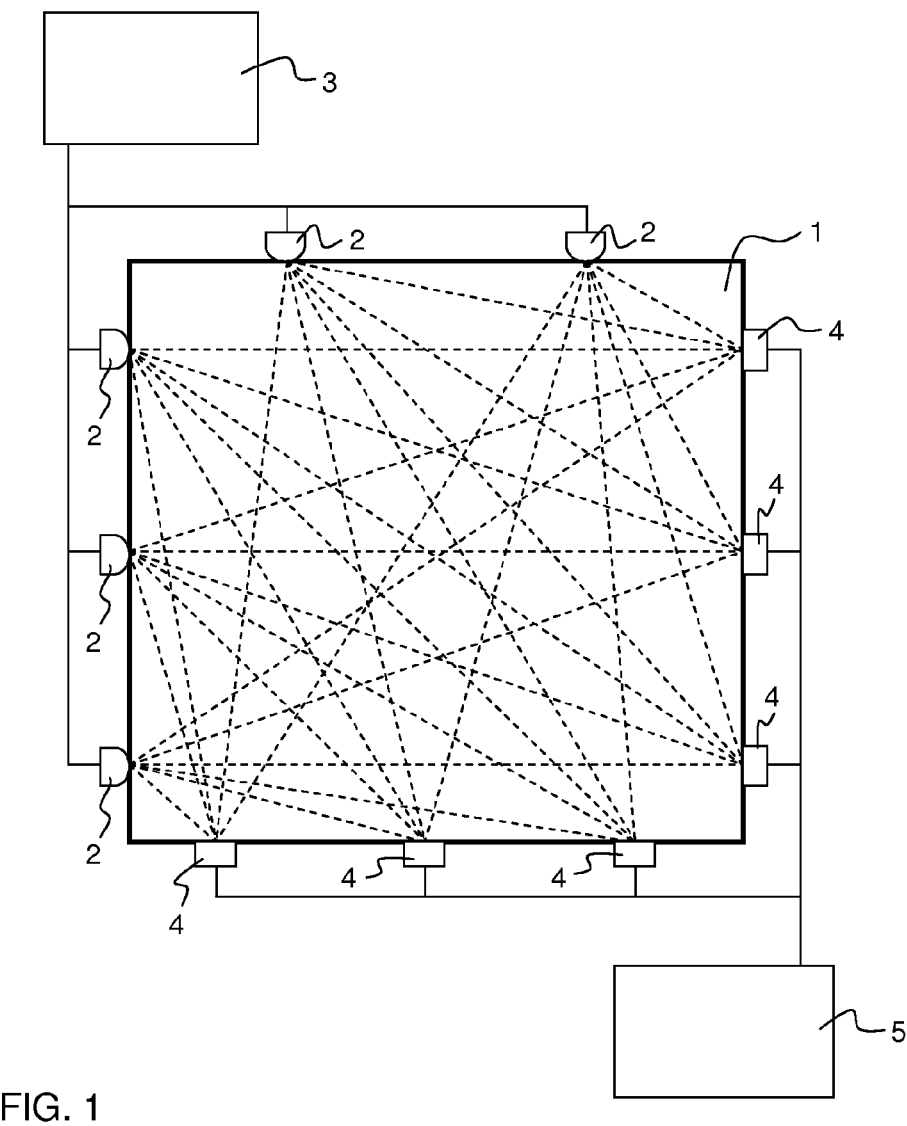
FIG. 1 is a top plan view of a touch sensing apparatus with detection of light beams above a touch surface.

The description starts out by presenting an embodiment of a touch sensing apparatus that creates a grid of light beams above a touch surface. Then follows a description of codes to be transmitted by a group of emitters in a touch sensing apparatus according to embodiments of the invention, together with examples of criteria for selecting and optimizing the codes and for combining codes between different groups of emitters. Thereafter, embodiments of alternative types of touch sensing apparatuses are described, as well as exemplifying arrangements of emitters and detectors. The description is concluded by a data processing example, and a general discussion about components of a touch sensing apparatus according to embodiments of the invention. Throughout the description, the same reference numerals are used to identify corresponding elements.

FIG. 1 is a top plan view of a touch surface 1 which is illuminated by a plurality of emitters 2. The emitters 2 are arranged around the periphery of the touch surface 1. Each emitter 2 can be activated by a control unit 3 to generate a diverging beam of light above the touch surface 1, as seen in a top plan view. The beam of light is suitably collimated to propagate parallel to the touch surface 1, as seen in the side view of FIG. 2. A plurality of optical detectors 4 are arranged around the periphery to detect the light emitted by the emitters 2, and a processing element 5 is electrically connected to the detectors 4 to receive a respective output or measurement signal that represents the light energy received by each detector 4.

Thus, light paths are formed between each emitter 2 and a number of detectors 4. The light paths, which are indicated by dashed lines, collectively define a detection grid. As shown in FIG. 1, each detector 4 receives light from a group of emitters 2, along a plurality of light paths, wherein each light path has a given angle of incidence to the detector 4.

Figure 2:
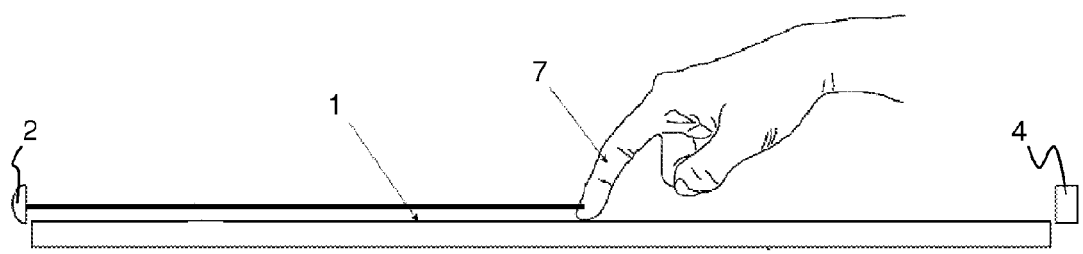
FIG. 2 is a side view of the apparatus in FIG. 1.

An object 7 that is brought into the vicinity of the touch surface 1 within the detection grid may at least partially block one or more light paths, as indicated in the side view of FIG. 2. Whenever the object 7 at least partially blocks two or more light paths, i.e. when the object 7 is brought close to any intersection between the dotted lines in FIG. 1, it is possible to determine the location of the object 7. The processing element 5 processes the output signals from the detectors 4 to identify the blocked light paths. Each blocked light path corresponds to an angle of incidence at a specific detector 4, and thus the processing element 5 can determine the location of the object 7 by triangulation.

The location of the object 7 is determined during a so-called sensing instance, and the temporal resolution of the apparatus in FIG. 1 is given by the duration of each sensing instance. The duration of a sensing instance is set by the time required for generating a complete detection grid and/or the time required for sampling the output signals from all detectors 4 at an acceptable signal-to-noise ratio (SNR).

The spatial resolution of the touch sensing apparatus of FIG. 1 is dependent on the density of the detection grid. For example, it may be desirable to attain a high and possibly uniform density of light path intersections. This may be achieved by proper selection of the number and location of emitters 2 and detectors 4, as well as by proper selection of the beam angle of the emitters 2 and the field of view of the detector 4 (i.e. the range of angles at which the detector is capable of receiving incoming light).

As noted above, each detector 4 receives light from a group of emitters 2. Thus, the output signal from each detector 4 will represent the received light energy from a number of light paths. The apparatus is designed to allow the processing element 5 to distinguish between the contributions of different emitters 2 to the output signal of a specific detector 4. To this end, each emitter 2 is controlled to transmit a code by way of the emitted light such that the code identifies the respective emitter 2 to the detector 4, and the processing element 5 is configured to separate the light received by the detector 4 from individual emitters 2 based on the transmitted codes. As will be further explained below, this allows two or more emitters 2 to generate a beam at the same time, even is these beams overlap on one and the same detector 4. This in turn enables the temporal resolution and/or the SNR to be improved, compared to a scenario in which the individual emitters 2 are activated in sequence one after the other during a sensing instance.

In the context of the present application, a "code" denotes any time-varying function that can be embedded in the transmitted light. For example, the code may be a sequence of discrete values, e.g. binary values. Alternatively, the code may be a periodic function, e.g. a cosine function.

Each code is typically emitted during a code-generating cycle. The code-generating cycles of different emitters 2 may or may not be concurrent in time. It should be understood that a detection grid for a sensing instance is set up when all emitters 2 of the touch sensing apparatus has completed one code-generating cycle.

Typically, the code is embedded into the emitted light by modulation. Thus, the processing element 5 is able to discriminate between simultaneous transmissions of modulated light from different emitters 2 based on the time-resolved output signal of a single detector 4. Thereby, the processing element 5 may identify each of the emitters 2 in the output signal and measure the energy of the modulated light from the identified emitter 2 in the output signal.

In one embodiment, the codes are selected such that a value of an autocorrelation of each code is significantly higher than a value of a cross-correlation between any two codes of different emitters 2. The processing element 5 may, e.g., measure the energy of the individual emitters 2 by auto-correlating the output signal with a set of known signal patterns that represent the available codes.

If the code is a sequence of discrete values, the code-generating cycle may include a sequence of time intervals, wherein each time interval includes one value of the code.

Figure 3A:
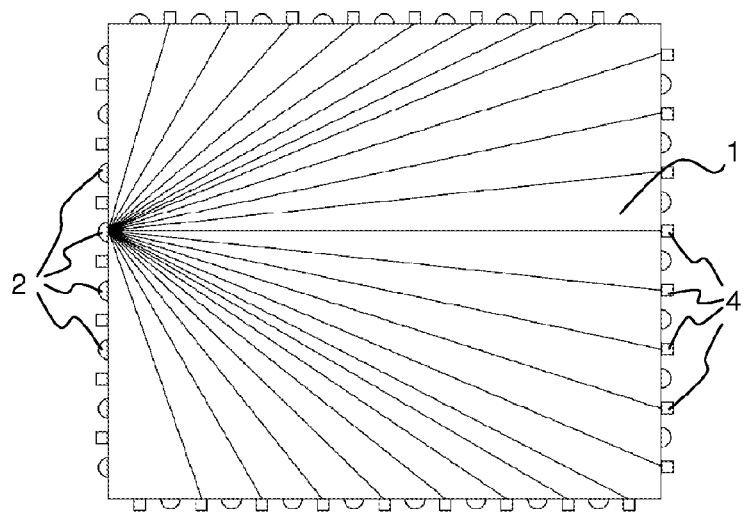
FIGS. 3(A)-3(C) are top plan views of another embodiment, with FIG. 3(A) illustrating light paths between a single emitter and plural detectors, FIG. 3(B) illustrating a detection grid formed by all light paths, and FIG. 3(C) illustrating the light paths affected by a touching object.
Figure 3B:
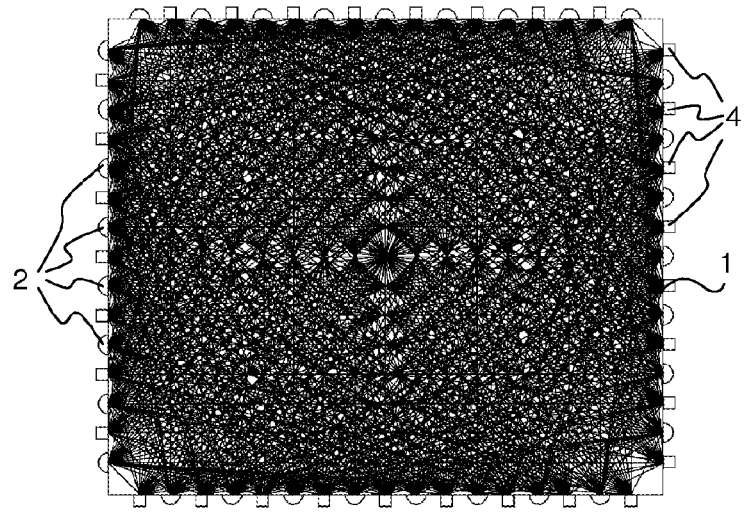

Before discussing the selection of codes in more detail, some general advantages of using wide-angle beams will be briefly discussed. FIG. 3 shows an embodiment in which a large number of emitters 2 and detectors 4 are alternately arranged around the periphery of the touch surface 1. FIG. 3(A) illustrates the light paths that are set up between one of the emitters 2 and a number of detectors 4 when the emitter emits a beam of light. FIG. 3(B) illustrates the complete detection grid that is generated during a sensing instance, when all emitters 2 have been activated. Clearly, a dense grid is generated, allowing a high spatial resolution.

Figure 3C:
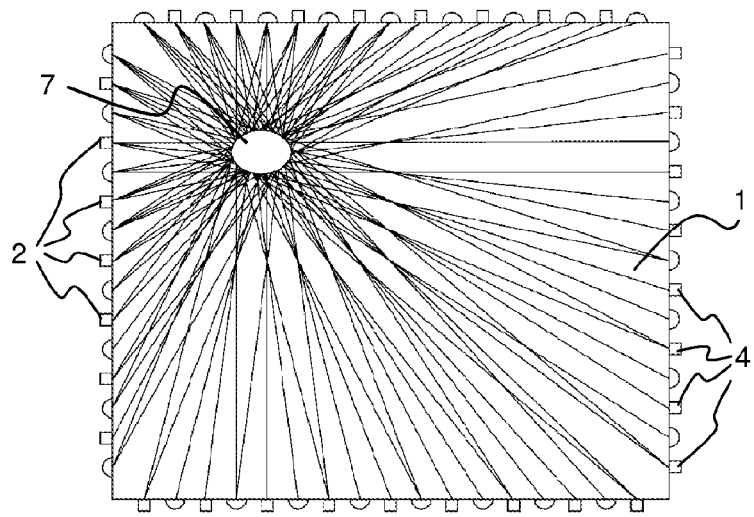

FIG. 3(C) illustrates an example of the light paths that are affected by an object 7 that is brought close to or touches the touch surface 1 during a sensing instance. The large number of affected light paths gives redundancy to the determination of the touch location. This redundancy allows for a high precision in the determined location. Alternatively or additionally, it may allow the processing element 5 to determine the size and/or shape of the object 7. Furthermore, the redundancy allows the processing element 5 to determine the locations of more than one touching object 7 during one sensing instance. Conventional touch sensing using an orthogonal grid of light paths above a touch surface is normally limited to detection of a single touching object 7, since the touching object shadows a section of the touch surface 1 and thereby prevents detection of another touching object in this shadowed section. However, is should be evident from FIG. 3 that a high density, non-orthogonal grid may be generated such that even if one touching object 7 blocks a number of light paths in the detection grid, the remaining (non-blocked) detection grid allows the processing element 5 to determine the location of further touching objects.

Code Selection

Generally, the following discussion examines different criteria for selecting the codes to be emitted by the respective emitters in the touch sensing apparatus. The following discussion is given in relation to an embodiment in which the codes, at least to the extent they are transmitted concurrently, are linearly independent. It should be noted that linearly independent codes also have the characteristic that a value of an autocorrelation of each code is significantly higher than a value of a cross-correlation between any two codes.

As will be shown below, the use of linearly independent codes generally enables efficient processing of the output signal to measure the energy received from the individual emitters. The linearly independent codes may form a multiplexing matrix, and the processing element can separate the energy from different emitters by operating the inverse of the multiplexing matrix on the output signal.

Further, in the following discussion, each code is made up of a sequence of binary values generated by on/off modulation of the emitter at the time intervals of the aforesaid code-generating cycle.

Thus, the amount of light emitted from the emitters is modulated with linearly independent functions in a multiplexing scheme. In one example, the amount of light detected by one detector that has five light paths to different emitters is given by $\eta = M \Leftrightarrow E$, i.e.

$$\begin{bmatrix} \eta_1 \\ \eta_2 \\ \eta_3 \\ \eta_4 \\ \eta_5 \end{bmatrix} = \begin{bmatrix} 1 & 1 & 0 & 0 & 0 \\ 0 & 1 & 1 & 0 & 0 \\ 0 & 0 & 1 & 1 & 0 \\ 0 & 0 & 0 & 1 & 1 \\ 1 & 0 & 0 & 0 & 1 \end{bmatrix} \begin{bmatrix} e_1 \\ e_2 \\ e_3 \\ e_4 \\ e_5 \end{bmatrix}$$

where $\eta_i$ is the light detected at the detector at a given time interval during the code-generating cycle, M is the multiplexing matrix, and $e_k$ is the amount of light that can reach the detector from emitter k.

In this example, each of the codes for the emitters is given by a sequence of five bits. For the first emitter the bit sequence is 10001 which correspond to the first emitter being switched on, off, off, off, on.

As described in detail below, the SNR may be improved if each emitter is controlled to emit light during longer times in each code-generation cycle, i.e. during more than one time interval. In the example above, two emitters emit light during each time interval. Each emitter will then emit light twice during a code-generation cycle.

To separate the detected signal into a measured energy from each emitter, the multiplexing matrix M is inverted, and the resulting inverse $M^{-1}$ is operated on the light detected at the detector according to: $E = M^{-1} \cdot \eta$.

In this example, the inversion process becomes:

$$\begin{bmatrix} e_1 \\ e_2 \\ e_3 \\ e_4 \\ e_5 \end{bmatrix} = \frac{1}{2} \begin{bmatrix} 1 & -1 & 1 & -1 & 1 \\ 1 & 1 & -1 & 1 & -1 \\ -1 & 1 & 1 & -1 & 1 \\ 1 & -1 & 1 & 1 & -1 \\ -1 & 1 & -1 & 1 & 1 \end{bmatrix} \begin{bmatrix} \eta_1 \\ \eta_2 \\ \eta_3 \\ \eta_4 \\ \eta_5 \end{bmatrix}$$

In this way, the processing element can compute the amount of light (energy) that reaches the detector from every single emitter.

In another example, the code of the first emitter is modified to include only one light pulse:

$$M = \begin{bmatrix} 1 & 1 & 0 & 0 & 0 \\ 0 & 1 & 1 & 0 & 0 \\ 0 & 0 & 1 & 1 & 0 \\ 0 & 0 & 0 & 1 & 1 \\ 0 & 0 & 0 & 0 & 1 \end{bmatrix}$$

Thereby, the matrix M may be easier to invert. For this multiplexing scheme the inversion process becomes:

$$\begin{bmatrix} e_1 \\ e_2 \\ e_3 \\ e_4 \\ e_5 \end{bmatrix} = \begin{bmatrix} 1 & -1 & 1 & -1 & 1 \\ 0 & 1 & -1 & 1 & -1 \\ 0 & 0 & 1 & -1 & 1 \\ 0 & 0 & 0 & 1 & -1 \\ 0 & 0 & 0 & 0 & 1 \end{bmatrix} \begin{bmatrix} \eta_1 \\ \eta_2 \\ \eta_3 \\ \eta_4 \\ \eta_5 \end{bmatrix}$$

The idea of controlling multiple emitters to emit light at the same time may be expanded to three emitters at a time, and so forth. An example of a matrix M for multiplexing scheme in which three emitters are activated during each time interval is:

$$M = \begin{bmatrix} 1 & 1 & 1 & 0 & 0 \\ 0 & 1 & 1 & 1 & 0 \\ 0 & 0 & 1 & 1 & 1 \\ 1 & 0 & 0 & 1 & 1 \\ 1 & 1 & 0 & 0 & 1 \end{bmatrix}$$

FIGS. 4(A)-(E) illustrate the embodiment of FIG. 1 at five sequential time steps during a code-generating cycle according to the last-mentioned multiplexing scheme (detectors not shown, emitters denoted e1-e5, and activated emitters being illustrated as emitting a diverging beam). Each time step represents a code value for each emitter. FIG. 5 is a timing diagram that illustrates the time steps of code-generation cycle (CGC) using on/off-modulation for each emitter e1-e5.

Figure 4:
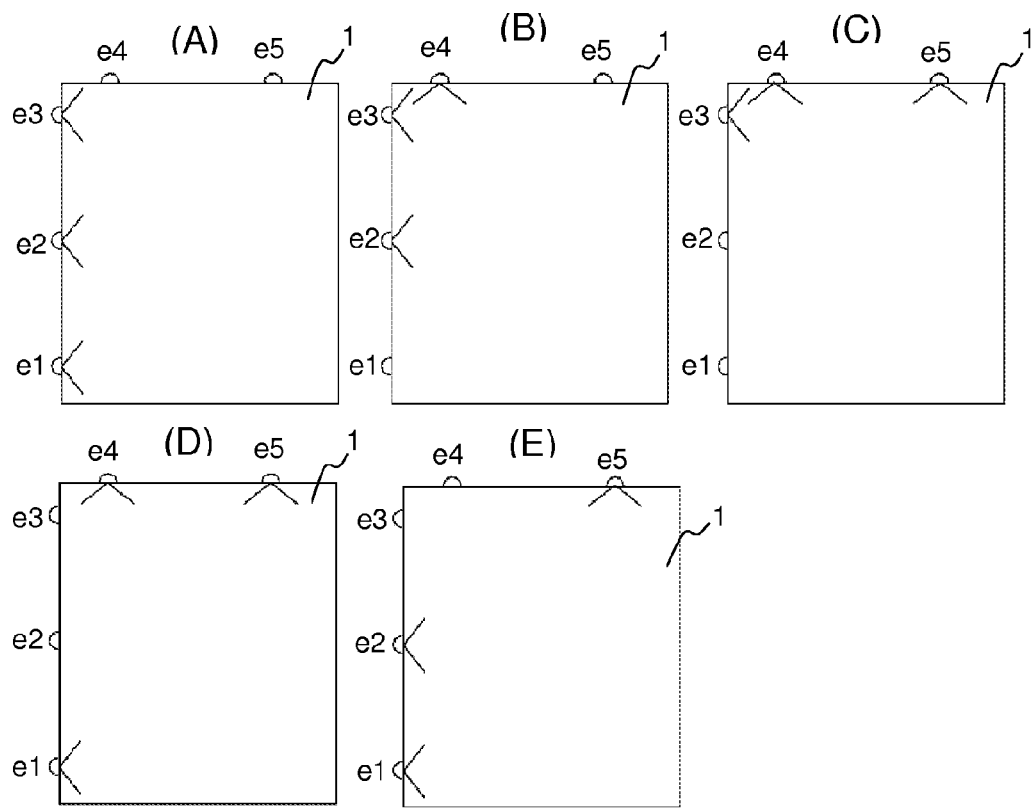
FIGS. 4(A)-4(E) are top plan views of the apparatus in FIG. 1, illustrating activation of emitters in a sequence of time intervals during a code-generation cycle.
Figure 5:
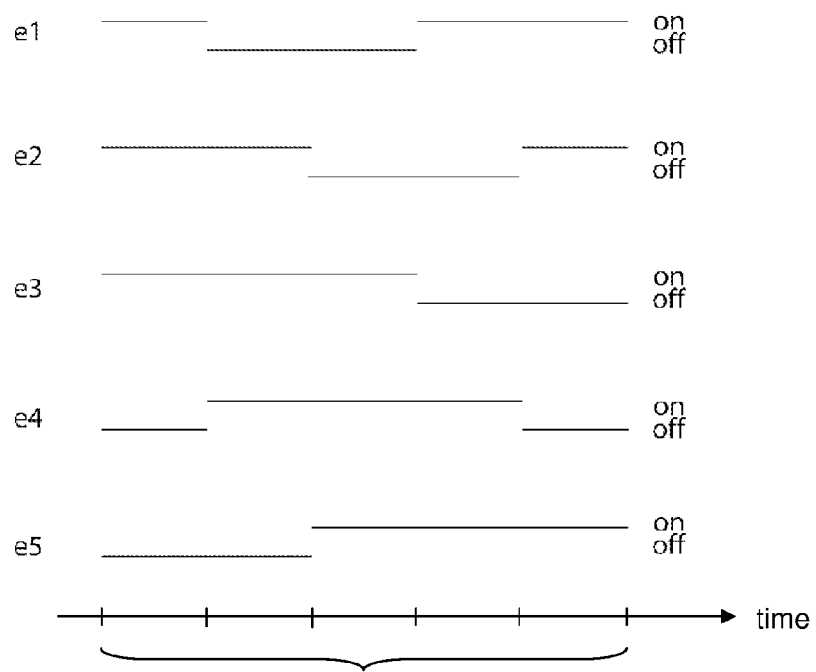
FIG. 5 is a timing diagram for the activation of the individual emitters in FIGS. 4(A)-4(E).

In the example of FIGS. 4-5, each emitter e1-e5 is controlled to emit light at the same time as at least one of its neighbors. However, it is currently believed that a better SNR may be achieved by controlling the emitters such that the emitters that are activated at the same time are more spread out along the periphery of the touch surface. Such an arrangement may result in a multiplexing matrix of more optimal properties, as will be explained further below.

In essence, the multiplexing scheme can be based on any invertible multiplexing matrix. However, there are certain criteria that, when fulfilled, may be used to design a multiplexing matrix that serves to further improve the SNR. Such a matrix may be useful when the code-generation cycle is to be limited in time, e.g. to achieve a high temporal resolution. For a detector having N light paths to different emitters, these criteria make it possible to increase the SNR up to a factor of $\sqrt{N}/2$ for a given duration of a sensing instance (compared to a sensing instance involving sequential activation of the emitters, denoted "non-multiplexed lighting scheme" in the following), or to decrease the duration of the sensing instance while maintaining the same SNR.

These criteria will be described and motivated in the following.

It should be emphasized, though, that these criteria are just examples of ways to improve or "optimize" the multiplexing matrices for a specific purpose. There may be other ways of improving the multiplexing matrices, for this or other purposes. Further, even an arbitrary selection of a multiplexing matrix with linearly independent columns will serve to improve the SNR compared to a non-multiplexed lighting scheme.

It should also be noted that although the following discussion may refer to on/off modulation, it is also applicable to other types of modulation of the emitters.

Optimization Criteria

Consider a system of N emitters and a single detector ($d_k$). Each emitter may contribute the following intensity to the investigated detector: $E = (e_1, e_2, e_3, \ldots, e_N)^T$. We want to find a multiplexing matrix, M, of size N×N that maximises the SNR. The measured signals, $\eta$ (one measured value on the detector, $d_k$, for each time interval), are thus: $\eta = M \cdot E + \epsilon$, where $\epsilon$ is the noise level in the measurements. Each column in the multiplexing matrix, $M = [m_1\ m_2\ \ldots\ m_N]$, is the multiplexing basis for a single emitter, $e_k$.

To find the energy received from each emitter, we multiply the measured signals with the inverse of the multiplexing matrix: $M^{-1} \cdot \eta = E + M^{-1} \cdot \epsilon$.

We see that we can compute the measured energy from each emitter as: $\hat{E} = M^{-1} \cdot \eta$. The resulting noise on the measured energy of the emitters is then given by $\hat{\epsilon} = M^{-1} \cdot \epsilon$. Since this algorithm uses the inverse of the multiplexing matrix, we see that we want to use a multiplexing matrix that has a low condition number.

The condition number of the matrix can be calculated as:

$$\kappa(M) = \|M^{-1}\| \cdot \|M\|$$

The condition number of a matrix measures the stability/sensitivity of the solution to a system of linear equations. In our context, it essentially means how errors in the inversion process affect the result of the de-multiplexing of the signals. When choosing a multiplexing matrix, it may be preferable that the norm of its inverse is small. Using an $l_2$-norm the condition number becomes:

$$\kappa(M) = \frac{\sigma_{max}}{\sigma_{min}},$$

where $\sigma_{max}$ and $\sigma_{min}$ are the maximum and minimum singular values of the matrix. Choosing a multiplexing matrix that has as low condition number as possible may be preferable in order not to increase the noise level during the inversion process. If we let M be a normal matrix ($M^T \cdot M = M \cdot M^T$), we can compute the condition number as $$\kappa(M) = \frac{|\lambda|_{max}}{|\lambda|_{min}},$$

where $|\lambda|_{max}$ and $|\lambda|_{min}$ are the maximum and minimum of the magnitudes of the eigenvalues of the matrix.

To get an estimate of how the noise propagates in the inversion process, we may look at the unbiased mean squared error (MSE) estimator: $MSE = E((E - \hat{E}) = cov(\hat{E})$.

The variance of the matrix is the diagonal elements of the covariance matrix, which is given by: $cov(\hat{E}) = \sigma^2 (M^T \cdot M)^{-1}$.

It can be shown that the individual noise contributions from the different measurements are uncorrelated. Consequently, we can disregard the off-diagonal elements of the covariance matrix. The sum of squared errors (SSE) is thus the sum of all diagonal elements in the covariance matrix, i.e. the individual variances of the estimated parameters.

In one embodiment, the SSE parameter is used as optimisation parameter for the multiplexing matrix: $SSE = \sigma^2 \text{trace}((M^T \cdot M)^{-1})$, where $\sigma^2$ is the variance of the noise in a non-multiplexed lighting scheme. The resulting variance (noise) in a single estimated value, $\hat{e}_k$, is then its corresponding diagonal element in the covariance matrix. The diagonal elements in the covariance matrix give the decrease in noise level (variance of the noise) in the system.

When finding an optimized solution, we try to minimize the above function. For a system where the noise is not dependent on the light incident on the detector and if the total number of emitters is fixed, we can simplify this minimisation problem to:

minimize(SSE)=minimize(trace($M^T \cdot M$)$^{-1}$).

It can be shown that the optimum number of emitters turned on at the same time is close to N/2. Thus, this value is likely to give close to optimum inversion properties of the multiplexing matrix.

Further, it can be shown that Hadamard and Sylvester matrices fulfil the desired aspects of a multiplexing matrix as described in the foregoing. The use of codes that form Hadamard/Sylvester multiplexing matrices may improve the SNR by a significant factor $(N+1)/2\sqrt{N}$, which for large N becomes $\sqrt{N}/2$.

Generally speaking, the multiplexing matrix can contain any values, as long as its determinant is non-zero, i.e. its columns are linearly independent.

The above-mentioned Hadamard matrix is a matrix that only contains values of 1 or −1 and whose columns are linearly independent. A Hadamard matrix can, for instance, be constructed by the following recursive definition:

$$H_m = \begin{pmatrix} H_{m-1} & H_{m-1} \\ H_{m-1} & -H_{m-1} \end{pmatrix}$$

$$H_0 = +1$$

A Hadamard matrix satisfies $H \cdot H^T = H^T \cdot H = N^2 \cdot I$, where I is the identity matrix. From the above recursive definition, it is clear that Hadamard matrices of order $N = 2^p$ exist, where p is a non-negative number. It can be shown that Hadamard matrices of order N=1, 2 and N=4·p exist.

The absolute eigenvalues of a Hadamard matrix (including its transpose and inverse) are all equal. This means that the condition number of the multiplexing inversion is 1, which thus provides low noise in the inversion process.

In the example of on/off modulation, it may be difficult to achieve negative signals. Seemingly, such modulation would be limited to binary multiplexing values, e.g. 0 (no light) and 1 (full power). It is however possible to set the zero signal level to half the maximum signal level and consider −1 to be no light and 1 full power.

To achieve the same multiplexing characteristics as the Hadamard matrix but with only zeros and ones in the multiplexing matrix, we can construct a Sylvester matrix by deleting the first row and column in a Hadamard matrix (creating a $\hat{H}$ matrix) and then substituting 1 (in Hadamard) to 0 (in Sylvester) and −1 (in Hadamard) to 1 (in Sylvester), $S = (1-\hat{H})/2$. An example of a Sylvester matrix is:

$$S_7 = \begin{bmatrix} 1 & 0 & 1 & 0 & 1 & 0 & 1 \\ 0 & 1 & 1 & 0 & 0 & 1 & 1 \\ 1 & 1 & 0 & 0 & 1 & 1 & 0 \\ 0 & 0 & 0 & 1 & 1 & 1 & 1 \\ 1 & 0 & 1 & 1 & 0 & 1 & 0 \\ 0 & 1 & 1 & 1 & 1 & 0 & 0 \\ 1 & 1 & 0 & 1 & 0 & 0 & 1 \end{bmatrix}.$$

The Sylvester versions of multiplexing matrices are normal matrices, i.e. $S^T \cdot S = S \cdot S^T$. All the absolute eigenvalues of a Sylvester matrix (including its transpose) are equal except for a single eigenvalue that is larger. The value of the largest eigenvalue is C, which is the number of emitters that are turned on at the same time. All the eigenvalues of the inverse of the Sylvester matrices are equal, except for one eigenvalue that is lower (1/C). Thus, the Sylvester matrices have good condition numbers and are useful in the multiplexing inversion process.

Multiplexing of Other Orders

The use of Hadamard/Sylvester multiplexing requires the number of emitters to be a multiple of 4, N=4p for Hadamard and N=4p−1 for Sylvester. In a multi-touch system that is rectangular, it is quite possible to arrange emitters and detectors such that each detector receives light from a multiple of 4 emitters. However, it may be desirable to be able to do multiplexing with an arbitrary number of emitters. Since the Sylvester matrix requires 4p−1 emitters, we may have to use a Hadamard/Sylvester matrix that is slightly larger than what actually is required by the actual number of emitters, i.e. we may have to add a number of fictive emitters.

One way to construct an optimum multiplexing matrix may be to use graph theory concerning Strongly Regular Graphs, srg, e.g. as described by R. C. Bose in "Strongly regular graphs, partial geometries and partially balanced designs", Pacific J. Math., Vol. 13, No. 2 (1963), pp 389-419. This type of graph may be defined as follows. G=(V,E) is a regular graph with V vertices, E edges, and degree k (the number of edges going out from each vertex). If there exist two integers $\lambda$ and $\mu$ such that every two adjacent vertices have $\lambda$ common neighbours, and every two non-adjacent vertices have $\mu$ common neighbours, then this graph is strongly regular and is denoted srg($\upsilon$, k, $\lambda$, $\mu$). It can be shown that the adjacency matrix of an srg(N, C, $\alpha$, $\alpha$), where C is the number of emitters turned on at the same time and $\alpha = C \cdot (C-1)/(N-1)$, forms an optimum multiplexing matrix.

The properties of the resulting multiplexing matrices are consistent with the properties of Hadamard/Sylvester matrices.

In a Hadamard or Sylvester matrix, as well as other optimum or near-optimum multiplexing matrices, roughly half of the emitters are turned on during each time interval. If saturation of the detectors is expected to be an issue, it might be desired to reduce the number of concurrently activated emitters. Reducing the energy that is detected by a detector may be done by reducing the order, C, of the the expression srg(N, C, α, α) that is used for computing the adjacency matrix for the graph. The order is the number of connections each vertex has with the other vertices, which is equivalent to the number of emitters that are turned on during each time interval.

Multiple Detector Multiplexing

If we have several different detectors in the system, the output signals of all detectors may be de-multiplexed using the inverse of one and the same multiplexing matrix. Thus, the multiplexing matrix may be designed to account for all emitters in relation to all detectors in the system.

However, if each detector only receives light from a subset of the emitters, it may be advantageous to use inverses of several multiplexing matrices, e.g. one for each detector.

Figure 6:
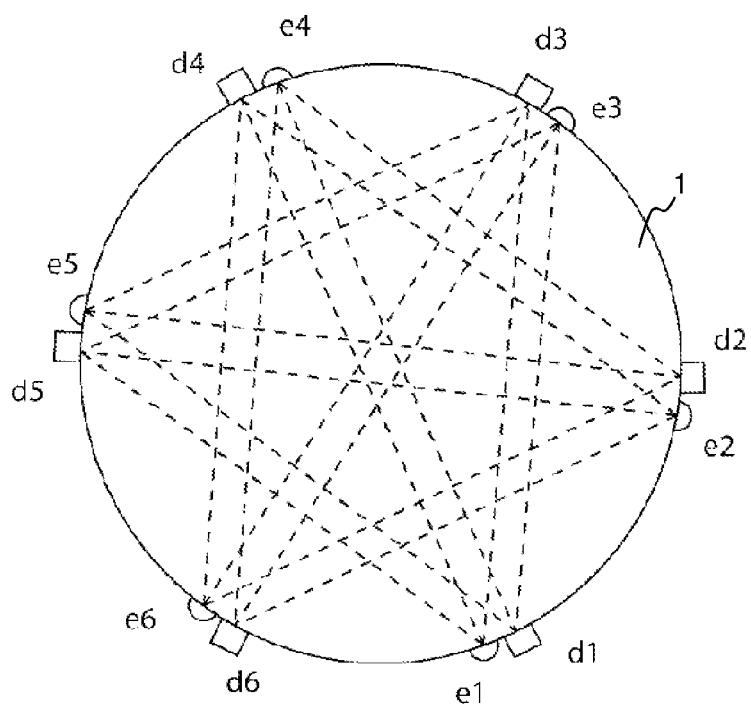
FIG. 6 is a top plan view of an alternative embodiment.

Such an embodiment will be further exemplified with reference to FIG. 6, which is a top plan view of a touch sensing apparatus with six emitters (denoted e1-e6) and six detectors (denoted d1-d6). The light paths between the emitters and detectors are indicated by dashed lines. In this example, the touch surface 1 is circular, but any other shape is possible, e.g. rectangular.

When an emitter emits light that may be detected by a subset of the detectors and another emitter emits light that may be detected by another subset of the detectors; the multiplexing matrix may be reduced to a set of multiplexing matrices that are permuted in a circular fashion. From FIG. 6, it is clear that there are only light paths between emitter e1 and detectors d3, d4 and d5, and that there are only light paths between emitter e2 and detectors d4, d5 and d6, and so forth.

Instead of using a 6-by-6 multiplexing matrix, it is possible to use a set of 3-by-3 matrices based on a main matrix S. For example, the main matrix may be given by:

$$S = \begin{bmatrix} 1 & 0 & 1 \\ 0 & 1 & 1 \\ 1 & 1 & 0 \end{bmatrix},$$

which is based on the linearly independent codes: $S_1=[1\ 0\ 1]^T$, $S_2=[0\ 1\ 1]^T$, $S_3=[1\ 1\ 0]^T$. Thus, the main matrix may be written as a combination of three individual codes: $S=[S_1\ S_2\ S_3]$. In this example, the main matrix is a Sylvester matrix. In a Hadamard/Sylvester matrix, the columns or the rows may change order (different row/column permutations) without changing the characteristics of the matrix. Thus, the emitters may be assigned a respective one of the codes $S_1$-$S_3$, such that a 3-by-3 multiplexing matrix is formed for each detector. In one example, emitters e1 and e4 are modulated with $S_1$, emitters e2 and e5 are modulated with $S_2$, and emitters e3 and e6 are modulated with $S_3$. In this example, the respective output signal of the detectors d1-d6 will be:

$$d_{5,\eta} = [S_1\ S_2\ S_3] \cdot \begin{bmatrix} e_1 \\ e_2 \\ e_3 \end{bmatrix}$$

$$d_{6,\eta} = [S_2\ S_3\ S_1] \cdot \begin{bmatrix} e_2 \\ e_3 \\ e_4 \end{bmatrix}$$

$$d_{1,\eta} = [S_3\ S_1\ S_2] \cdot \begin{bmatrix} e_3 \\ e_4 \\ e_5 \end{bmatrix}$$

$$d_{2,\eta} = [S_1\ S_2\ S_3] \cdot \begin{bmatrix} e_4 \\ e_5 \\ e_6 \end{bmatrix}$$

$$d_{3,\eta} = [S_2\ S_3\ S_1] \cdot \begin{bmatrix} e_5 \\ e_6 \\ e_1 \end{bmatrix}$$

$$d_{4,\eta} = [S_3\ S_1\ S_2] \cdot \begin{bmatrix} e_6 \\ e_1 \\ e_2 \end{bmatrix}$$

This type of simple circular construction of multiplexing matrices is possible when the ratio between the total number of emitters and the number of light paths to each detector is an integer number >2. If the ratio is not such an integer number, a number of fictive emitters may be added for the ratio to be an integer number. Further, it may be desirable for the ratio between the total number of emitters (including any fictive emitters) and the size of the main matrix to be an integer number >2, and thus the number of bits in the codes of the main matrix may need to be increased.

It is to be understood that the above is merely an example, and that there are other ways of enabling the use of individual multiplexing matrices for different detectors.

Application to Alternative Touch Sensing Techniques

The above-described techniques of emitting codes and separating the light received by a detector based on the codes are equally applicable to other concepts for touch detection. Below, a number of different concepts will be described. Although not explicitly discussed in relation to each configuration, it should be understood that all of the disclosed configurations may include a processing element and a control unit that operate as discussed above in relation to the embodiment in FIGS. 1-2.

Figure 7:
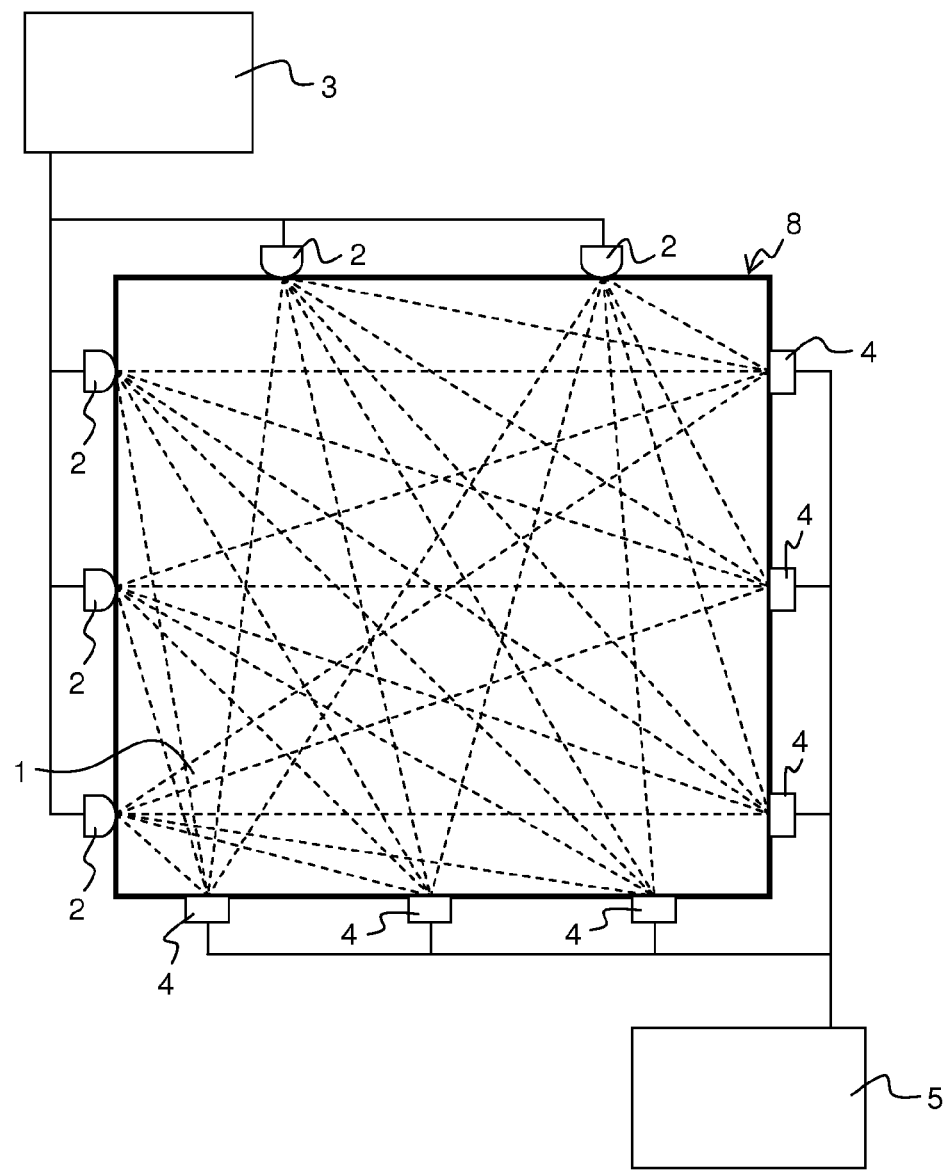
FIG. 7 is a top plan view of a touch sensing apparatus with detection of light beams propagating inside a light transmissive panel.
Figure 8:
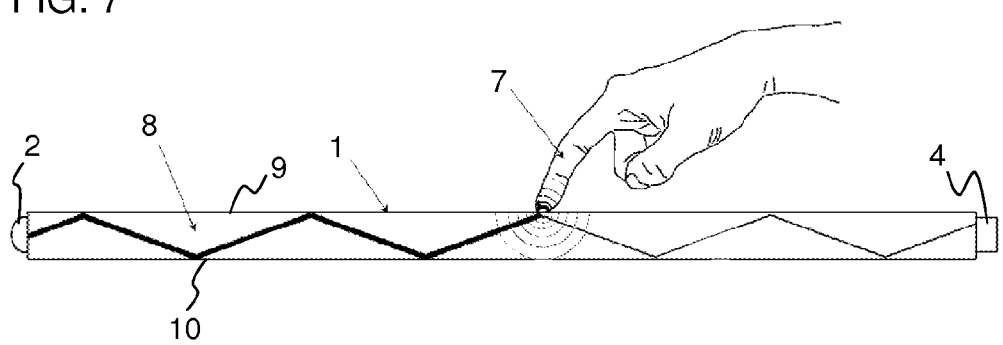
FIG. 8 is a side view of the apparatus in FIG. 7.

In one alternative touch-sensing apparatus, the detection grid and thus a touch surface 1 is formed at a boundary surface of a light transmissive panel, by propagating light inside the light transmissive panel. Such an embodiment is shown in FIGS. 7-8, in which a number of emitters 2 are arranged around the periphery of a light transmissive panel 8, to inject a respective beam of light into the panel, typically via the edges of the panel 8, or via one or more wedges (not shown) arranged on the top or bottom surface 9, 10 of the panel 8. Each beam of light is diverging in the plane of the touch surface 1, i.e. as seen in a top plan view, and may or may not be diverging in a plane perpendicular to the touch surface 1, i.e. as seen in a side view (cf. FIG. 8). One or more detectors 4 are arranged around the periphery of the panel 8 to measure the energy of received light. Light may e.g. be received by the detectors 4 via the side edges of the panel 8, or via one or more wedges (not shown) arranged on the top or bottom surfaces of the panel 8. Thus, each detector 4 receives light from a group of emitters 2 along a set of light paths. The panel 8 defines two opposite and generally parallel surfaces 9, 10 and may be planar or curved. A radiation propagation channel is provided between two boundary surfaces 9, 10 of the panel 8, wherein at least one of the boundary surfaces allows the propagating light to interact with a touching object 7. Typically, the light propagates by total internal reflection (TIR) in the radiation propagation channel. In this interaction, part of the light may be scattered by the object 7, part of the light may be absorbed by the object 7, and part of the light may continue to propagate unaffected. Thus, as shown in the side view of FIG. 8, when the object 7 touches a boundary surface of the panel (e.g. the top surface 9), the total internal reflection is frustrated and the energy of the transmitted light is decreased. The location of the touching object 7 may be detected by measuring the energy of the light transmitted through the panel 8 from a plurality of different directions.

It is thus understood that the above-described techniques of controlling the emitters 2 to transmit codes and of separating the light received from individual emitters 2 based on the transmitted codes may be used to identify any light paths to each detector 4 that are affected by the touching object 7.

It should be noted that, unlike the embodiment of FIGS. 1-2, the light will not be blocked by the touching object 7. Thus, if two objects happen to be placed after each other along a light path from an emitter 2 to a detector 4, part of the light will interact with both objects. Provided that the light energy is sufficient, a remainder of the light will reach the detector 4 and generate a measurement signal that allows both interactions to be identified. This means that the generation of the detection grid inside the panel 8 may improve the ability of the apparatus to detect the locations of multiple touching objects during a sensing instance.

Normally, each touch point $p_n$ has a transmission $t_n$, which is in the range 0-1, but normally in the range 0.7-0.99. The total transmission $T_{ij}$ along a light path $S_{ij}$ is the product of the individual transmissions $t_n$ of the touch points $p_n$ on that light path: $T_{ij}=\Pi t_n$. For example, two touch points $p_1$ and $p_2$ with transmissions 0.9 and 0.8, respectively, on a light path $S_{ij}$, yields a total transmission $T_{ij}=0.72$.

Like in FIG. 1, each of the emitters 2 may emit a diverging beam of light, and one or more detectors 4 may receive light from plural emitters. However, it may not be necessary for emitters 2 to inject diverging beams into the panel. If sufficient scattering is present in the panel, the injected beams will be inherently broadened in the plane of the panel 8 as they propagate from the injection site through the panel 8. For each internal reflection, some radiation is diverted away from the main direction of the beam, and the center of the beam looses energy with distance. Scattering is particularly noticeable if an anti-glare structure/layer is provided on one or both of the boundary surfaces 9, 10. The anti-glare structure/layer provides a diffusing structure which may enhance the scattering of the beam for each internal reflection, and which may also cause radiation to escape through the surface 9, 10 for each internal reflection. Thus, the provision of an anti-glare structure/layer generally increases the broadening of the beam with distance from the injection site.

The use of an anti-glare structure/layer may be advantageous to reduce glares from external lighting on the touch surface 1 of the panel 8. Furthermore, when the touching object 7 is a naked finger, the contact between the finger 7 and the panel 8 normally leaves a fingerprint on the touch surface 1. On a perfectly flat surface, such fingerprints are clearly visible and usually unwanted. By adding an anti-glare structure/layer to the surface, the visibility of fingerprints is reduced. Furthermore, the friction between finger and panel decreases when an anti-glare is used, thereby improving the user experience.

Figure 9:
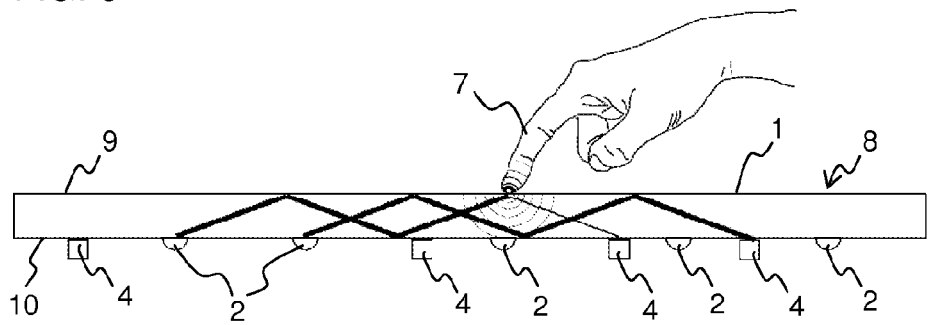
FIG. 9 is a side view of another touch sensing apparatus with detection of light beams propagating inside a light transmissive panel.
Figure 10:
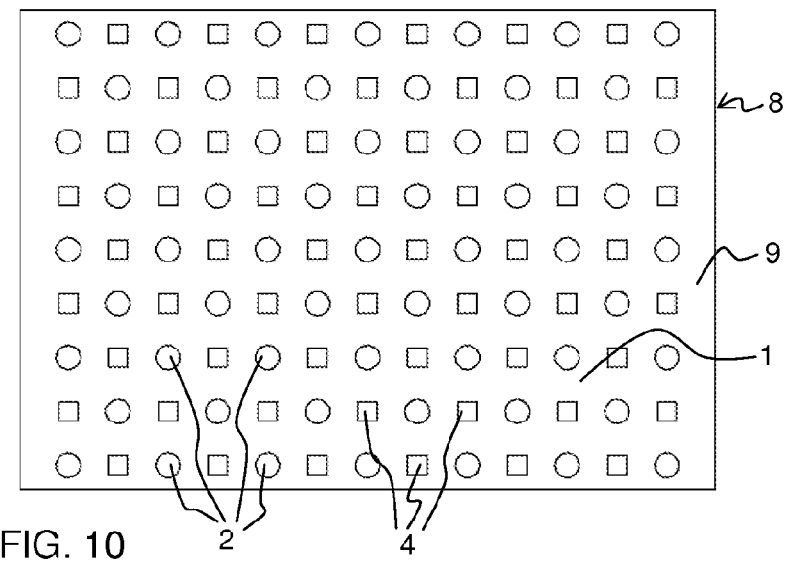
FIG. 10 is a top plan view of the apparatus in FIG. 9.

FIG. 9 is a side view of an alternative configuration, in which light also propagates inside a light transmissive panel 8. Here, emitters 2 are arranged beneath the panel 8 to inject a respective beam of light through the lower boundary surface 10 into the panel 8. The injected beam of light propagates by total internal reflection between the boundary surfaces 9, 10, and the propagating light is intercepted by a number of detectors 4. These detectors 4 are also arranged beneath the panel 8, typically interspersed among the emitters 2. One example of such an arrangement of interspersed emitters 2 and detectors 4 is shown in the top plan view of FIG. 10. It is understood that a number of light paths may be set up between each emitter 2 and a number of adjacent detectors 4, thereby creating a detection grid at the upper boundary surface 9.

FIG. 9 illustrates a respective light path set up between two different pairs of emitters 2 and detectors 4. When an object 7 touches the top surface 9 of the panel 8, one or more of the propagating beams will be frustrated, and the detector 4 will measure a decreased energy of received light. It should be realized that if the detection grid is known, and if the measured energy at each detector 4 can be separated into different light paths, it is possible to determine the location of a touching object 7 based on the light paths that experience a decrease in measured light energy.

It is thus understood that the above-described techniques of controlling the emitters 2 to transmit codes and of separating the light received from individual emitters 2 based on the transmitted codes may be used to identify any light paths to each detector 4 that are affected by the touching object 7.

As seen in FIG. 9, part of the propagating light is scattered by the touching object 7. This scattered light may also be detected by one or more detectors 4. However, the energy of the scattered light is generally much less than the energy that is attenuated in the interaction with the touching object 7. Thus, the scattered light will generally not contribute significantly to the energy measured by the detectors 4 in the apparatus.

Typically, each emitter 2 generates a diverging beam such that at least part of the beam will have an angle of incidence to the normal of the upper boundary surface 9 that is larger than the critical angle. The emitter 2 may be arranged to emit the beam with a beam angle of at least 90°, and preferably of at least 120°. In one embodiment, the beam angle is close to 180°, such as at least 160°. The beam may or may not have a main direction which is orthogonal to the upper boundary surface 9. When using diverging beams, a significant part of the emitted radiation may pass through the panel 8 instead of being internally reflected. To this end, an element (not shown) may be provided between each emitter 2 and the lower boundary surface 10 to block a part of the emitted beam, so as to only pass rays that have an angle of incidence at the upper boundary surface 9 that sustains total internal reflection. Alternatively, the element may be configured to redirect the rays in said part of the beam so as to cause these rays to have at least the necessary angle of incidence at the upper boundary surface 9.

Alternatively, each emitter 2 may emit collimated light at a suitable angle to the normal of the upper boundary surface 9.

When light is propagated inside a transmissive panel 8, the resulting signal levels at the detectors 4 may be lower compared to when light is propagated above a touch surface 1. Thus, the above-described optimization criteria may need to be revised to also account for shot noise (photon noise) when optimizing the multiplexing matrix. In this case, we want to minimize a modified SSE function:

$$SSE=(\sigma^2+C\sigma_s^2)\mathrm{trace}((M^T \cdot M)^{-1}),$$

where $\sigma^2$ is the variance of the signal-independent noise, $\sigma_s^2$ is the variance of the signal-dependent noise, and C is the number of emitters turned on at the same time.

When the shot noise is a significant factor, we may start by finding an optimum or near-optimum multiplexing matrix M without considering the shot noise (though we may consider saturation, see above). When the matrix M is found, we may compute the SNR improvement using the modified SSE function. We can then compute the optimal setting of C (below the saturation limit) to get an optimum or near-optimum multiplexing matrix with shot noise taken into account, i.e. the matrix yielding the best SNR improvement.

Figure 11:
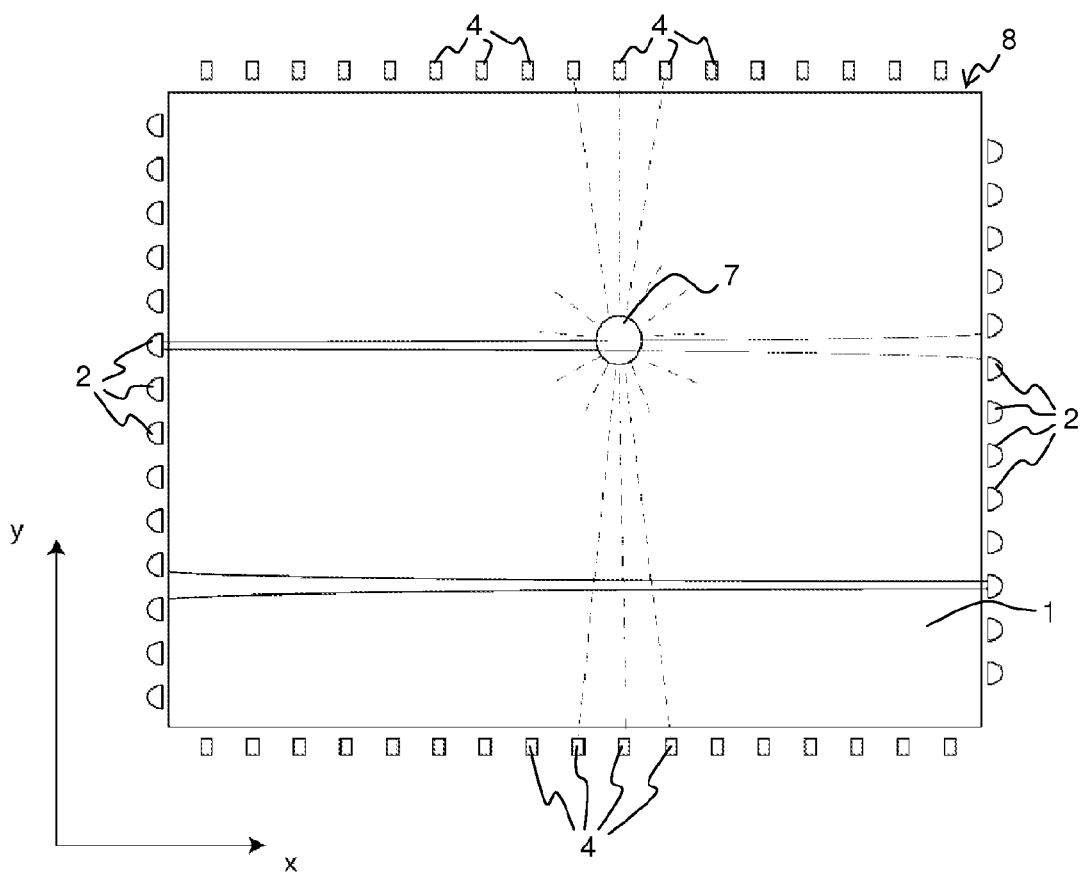
FIG. 11 is a top plan view of a touch sensing apparatus with detection of light scattered from a touching object.

The alternative detection concepts presented above rely on detecting/measuring an attenuation of propagating light that is caused by one or more touching objects. According to yet another alternative detection concept, touch locations are determined based on the light that is scattered by a touching object. FIG. 11 illustrates an example embodiment in which light is injected to propagate inside a light transmissive panel 8 as described in the foregoing. In the example of FIG. 11, emitters 2 are arranged along two opposing sides of the panel 8 to emit a respective beam of light (only two beams shown). The light beam from each emitter 2 preferably has a small beam angle, and may be collimated. Thus, in this example, each emitter 2 generates a light path across the panel 8. In the illustrated example, the detectors 4 are positioned along the other two sides of the panel 8, perpendicular to the emitters 2, typically to receive light via the side edges of the panel 8, or via one or more wedges (not shown) arranged on the top or bottom surfaces of the panel 8. An object 7 touching the panel 8 will cause light to be scattered in all directions inside the panel 8. A number of detectors 4 will detect the scattered light, but due to the bulk absorption in the plate, radial intensity dependence, and possibly surface scattering, the detector 4 positioned at the same X coordinate as the touching object 7 will detect the highest intensity of scattered light. Thus, an X coordinate of the touching object 7 can be determined from the total energy measured by the respective detector 4. To increase the precision, the detectors 4 may be configured with a confined field of view, so that only light scattered at the X coordinate, or nearby X coordinates, of a detector may be detected by that detector. This may be achieved by any combination of lenses, pinholes, etc, between the panel 8 and the detector 4. Alternatively or additionally, an air gap may be provided between the panel 8 and the detectors 4, whereby total reflection of scattered light in the panel side edge will limit the field of view of the detectors.

The Y coordinate of the touching object is determined by determining the emitter(s) 2 that generated the scattered light measured by one or more detectors 4. It is thus understood that the above-described techniques of controlling the emitters 2 to transmit codes and of separating the light received from individual emitters 2 based on the transmitted codes may be used to identify any light paths that are affected by the touching object 7. In the example of FIG. 11, the light paths are parallel to the X axis, and the Y coordinate of the touching object 7 will be given by the Y coordinate(s) of the emitter(s) 2 generating the identified light path(s). In an alternative configuration, the light paths could be non-parallel to the X axis. As long as the directions of the light paths are known, and the X coordinate has been obtained, the Y coordinate can be calculated when an affected light path has been identified.

In the above-configuration, one position coordinate (Y) is determined based on the affected light paths, as identified by separating the light received by the detector(s).

In an alternative (not shown), both position coordinates (X, Y) may be determined by identifying light paths based on the light received by the detector(s). In one such configuration, the emitters 2 are arranged to generate light paths that intersect within the touch surface 1. Thereby, both the X and Y coordinates may be determined by separating the light received by the detector(s), by identifying light from at least one emitter in the separated light, and by reconstructing the intersection(s) of the light paths of the thus-identified emitters.

It should be understood that the detection concept discussed above in relation to FIG. 11 is equally applicable when the light is emitted to propagate above a touch surface 1.

Still further, this detection concept is not restricted to the illustrated arrangement of emitters 2 and detectors 4. For example, the emitters 2 and/or detector 4 could be arranged along only one side of the touch surface 1. Alternatively, emitters 2 and detectors 4 may be interleaved at one or more sides of the touch surface 1. In fact, it may be advantageous to combine detection of attenuation with detection of scattered light. For example, if the embodiment of FIGS. 7-8 is implemented with the detection grid of FIG. 3(B), the detectors 4 that do not receive direct light from the emitters may 2 be used to detect the light that is scattered by objects 7 touching the panel 8. Thus, whenever a specific detector does not receive direct light it may be used for scatter detection. The scattered light may be used to improve the precision of the determined location of the touching object 7.

Peripheral Arrangements of Detectors and Emitters

The following relates to potential advantages of using different arrangements of emitters and detectors in the embodiments shown in FIGS. 1-2 and FIGS. 6-8, i.e. when emitters 2 and detectors 4 are arranged around the periphery of a touch surface 1 to define a detection grid of light paths.

In one variant, the emitters 2 and the detectors 4 may be alternated around the periphery of the touch surface 1 (cf. FIG. 3). This may, e.g., result in a more uniform detection grid.

In this and other variants, the number of emitters 2 may equal the number of detectors 4.

Figure 12:
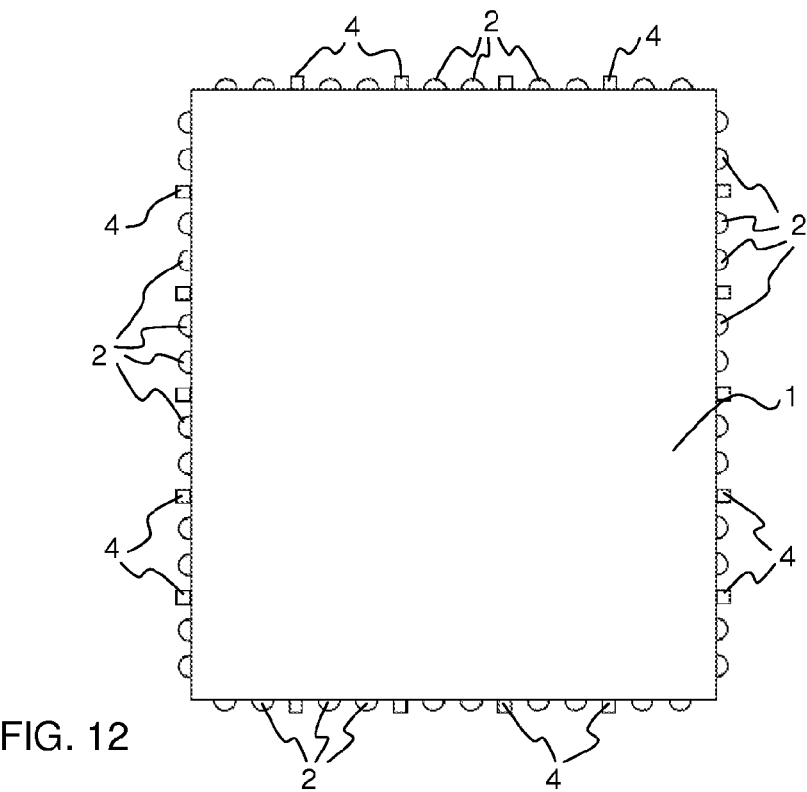
FIGS. 12-15 are top plan views illustrating exemplary arrangements of emitters and detectors around the periphery of a touch surface.

Alternatively, the number of emitters 2 may exceed the number of detectors 4, e.g. as shown in FIG. 12. An increased number of emitters 2 may be used to decrease the number of detectors 4 and thus reduce cost. The spatial resolution mainly depends on the number of light paths, and emitters 2 may be cheaper than detectors 4 and possibly additional detector equipment such as lenses, A/D-converters, amplification circuits or filters.

Figure 13A:
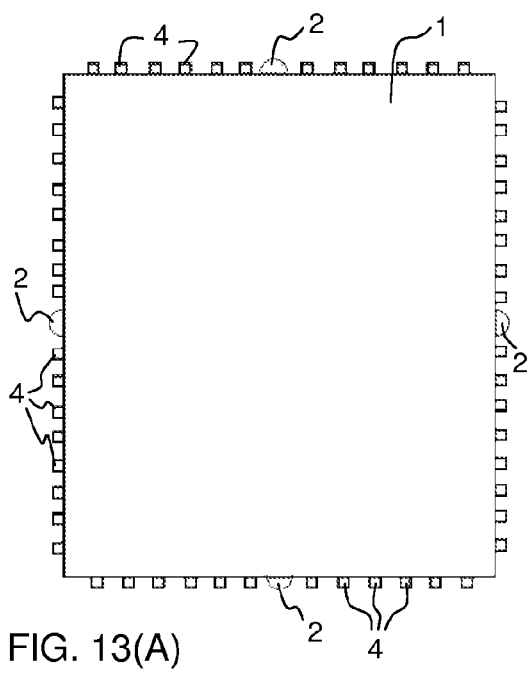
Figure 13B:
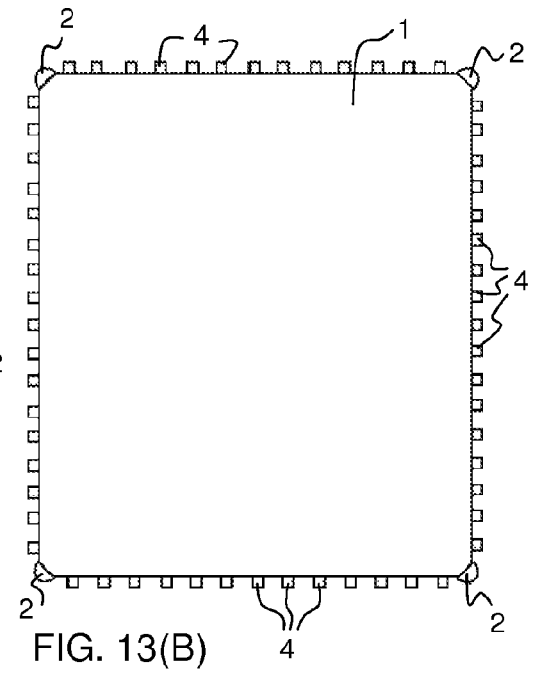

In yet another alternative configuration, the number of detectors 4 exceeds the number of emitters 2. Examples of such configurations are shown in FIGS. 13(A)-(B). One advantage of such configurations may be to reduce the size of the multiplexing matrix and thereby the sampling frequency, i.e. the frequency of sampling the output signals of the detectors 4.

Figure 14:
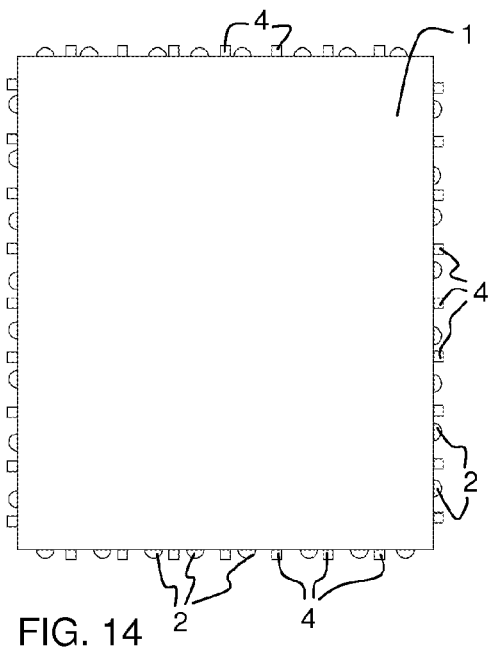

In these and other variants, the emitters 2 and detectors 4 may be arranged equidistantly around the periphery of the touch surface 1, e.g. as shown in FIGS. 3, 12 and 13. Alternatively, as shown in FIG. 14, the distances between each emitter 2 and/or detector 4 may be randomized. For example, randomized distances between the emitters 2 may be used to reduce interference phenomena that may appear when a number of light sources inject light of the same wavelength into the panel.

Figure 15:
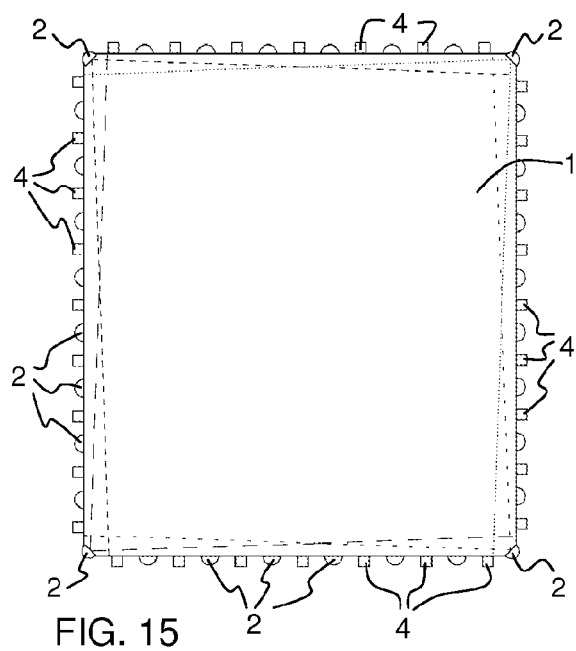

FIG. 15 illustrates yet another embodiment where emitters 2 near or at the corners of the touch surface 1 are positioned so as to emit light with a wide light beam directed towards the center of the touch surface 1 so as to spread the emitted light over as large a portion of the touch surface 1 as possible. If near-corner emitters 2 are positioned so as to emit light centered perpendicular to the periphery of the touch surface 1, a large portion of the emitted beam will reach a detector 4 after having propagated only a short path across the touch surface 1. Hence, the resulting light paths between near-corner emitters 2 and detectors 4 may cover only a small area of the touch surface 1. It may therefore be advantageous to position near-corner emitters, as well as corner emitters, if present, so as to point towards the center of the touch surface. This embodiment is generally applicable whenever the touch surface is polygonal, and at least one emitter is arranged at a corner of the touch surface. In one variant, all emitters are positioned to point towards the center of the touch surface, thereby ensuring that as much as possible of the emitted light is used for touch detection.

Figure 16:
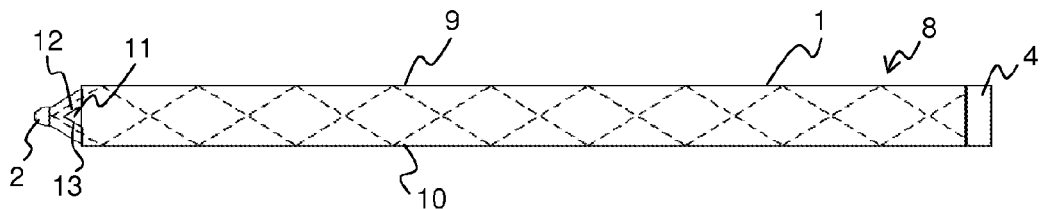
FIG. 16 is a side view of an exemplary arrangement of an emitter and a panel.

FIG. 16 is a side view of an embodiment, in which emitters 2 (one shown) are arranged at the periphery to inject a respective beam of light into a light transmissive panel 8. A V-shaped light deflector 11 is placed between each emitter 2 and the panel 8. The light deflector 11 is configured to redirect, by way of angled mirror surfaces 12, 13, rays that are emitted essentially parallel to the opposite surfaces 9, 10 of the panel 8. Specifically, the rays are redirected towards either of the boundary surfaces 9, 10 at an angle that ensures propagation by total internal reflection. In another embodiment (not shown), the deflector 11 is replaced or supplemented by an element that prevents light rays from reaching the detector without having been reflected in the touch surface 1 at least once. Any part of the light that propagates through the panel 8 without being reflected in the touch surface 1 does not contribute to the touch detection signal, as this light cannot be frustrated by a touching object. Such a blocking element may be an absorbing or reflecting element/layer, which may be arranged between the emitter 2 and the side edge of the panel 8, and/or between the side edge of the panel 8 and the detector 4. For example, the blocking element may be attached to the side edge of the panel 8.

Similar deflecting elements or blocking elements may be arranged intermediate the emitters 2 and the panel 8 when the emitters 2 are arranged beneath the panel, as discussed above in relation to FIG. 9-10.

In any of the embodiments disclosed herein, a lens (not shown) may be inserted between the panel 8 and the detector 4 so as to focus light onto the detector surface. This may increase the SNR.

Whenever light propagates inside a transmissive panel 8, it may be advantageous to provide an air gap between the panel 8 and the detectors 4. The air gap will result in a reduced field of view of the detectors 4, which in turn may serve to reduce shot noise in the detection.

Data Processing

Figure 17:
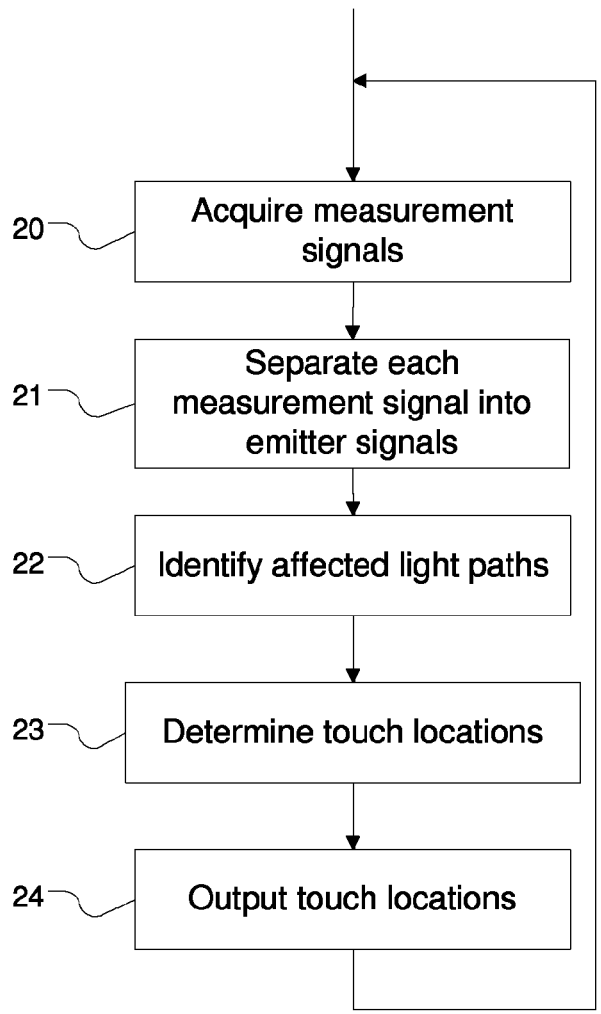
FIG. 17 is a flow chart of an exemplary method for determining touch locations.

In all of the above described embodiments, configurations, arrangements, alternatives and variants, the processing element 5 (see FIGS. 1 and 3) may be configured to calculate the touch locations based on output or measurement signals obtained from the detectors 4. The skilled person will readily realize that there are numerous methods for determining the touch locations. FIG. 17 is a flow chart of an exemplifying method.

In step 20, measurement signals are acquired from the detectors in the system. Each measurement signal represents the sum of light received from k different angles (i.e. k different emitters), sampled at n time intervals during a sensing instance.

In step 21, each measurement signal is separated into a set of emitter signals, using the multiplexing inversion scheme. Each emitter signal thus represents the received light energy along one of the available light paths to the relevant detector. The measurement/emitter signals may also be pre-processed. For example, the measurement/emitter signals may be processed for noise reduction using standard filtering techniques, e.g. low-pass filtering, median filters, Fourier-plane filters, etc. Further, if the energy of the emitted beams is measured in the system, the measurement/emitter signals may be compensated for temporal energy fluctuations in beam energy. Still further, the touch surface may be a sub-area of the detection grid, and certain emitter signals may thus originate from light paths outside this sub-area. Thus, the pre-processing may involve removing such emitter signals from further processing. Furthermore, the emitter signals may be rectified, which essentially means that the emitter signals of each detector are interpolated to achieve the same mutual angle between all incoming light paths to the detector. Thus, the emitter signals for each detector are interpolated with a non-linear angle variable, resulting in a complete set of emitter signals that are evenly distributed over the panel. Rectification is optional, but may simplify the subsequent computation of touch locations. Rectification may alternatively be made on transmission signals (below).

In step 22, the emitter signals are processed to identify any light paths that are affected by touching objects.

If the light is propagated above the touch surface, these light paths are blocked or occluded by the touching object(s) and are thus identified by an absence of the corresponding emitter signals.

If the light is propagated inside a panel, these light paths are identified based on an attenuation of the emitter signals. Suitably, a transmission signal is calculated for each pre-processed emitter signal, by dividing the emitter signal with a background signal, which represents an energy of the emitter signal without any object touching the touch surface. The background signal may or may not be unique to each detector or each emitter signal. The background signal may be pre-set, obtained during a separate calibration step, or obtained from the same emitter signal acquired during one or more preceding sensing instances, possibly by averaging the resulting set of emitter signals. The resulting transmission signals will indicate any light paths that are affected by touching objects.

Figure 18A:
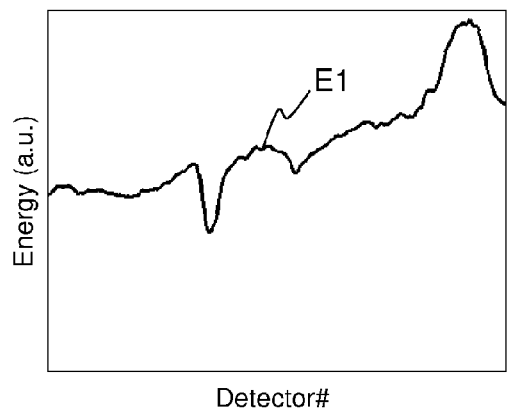
FIGS. 18A, 18B, 18C, 19A and 19B are graphs of signals obtained in a touch sensing apparatus.
Figure 18B:
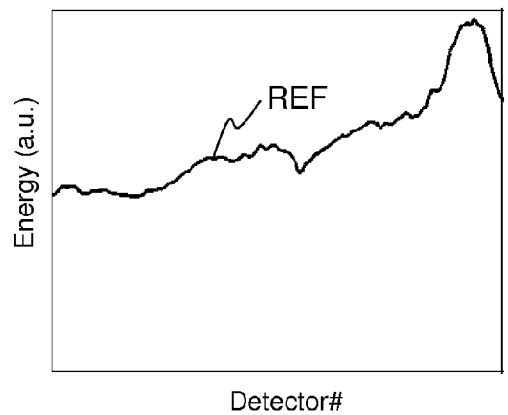
Figure 18C:
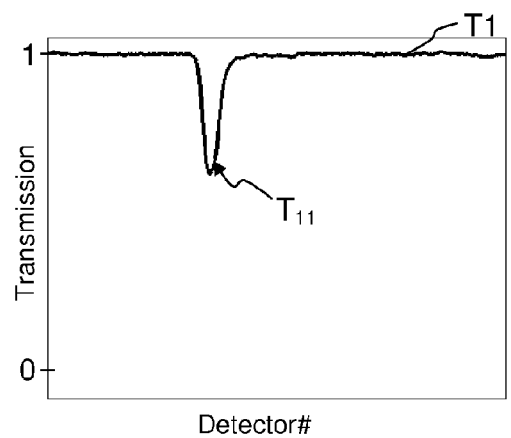

To further illustrate the calculation of transmission signals, FIG. 18A shows a subset of the emitter signals E1 obtained during one sensing instance with a single object touching the panel. Specifically, FIG. 18A is a plot of the received light energy on light paths extending between a single emitter and an ordered set of detectors along the periphery of the touch surface, e.g. as shown in FIG. 3(A). FIG. 18B shows corresponding background signals REF, also given as a plot of received light energy for the same set of light paths. In this example, the distribution of radiation across the detectors is highly non-uniform. FIG. 18C shows the resulting transmission signals T1=E1/REF, which result in a essentially uniform signal level at a (relative) transmission of about 1 with a peak $T_{11}$ caused by the touching object. It is to be understood that the conversion of emitter signals into transmission signals greatly facilitates the identification of relevant peaks, and thus the affected light paths. It also makes it possible to compare emitter signal values obtained on different light paths.

Figure 19A:
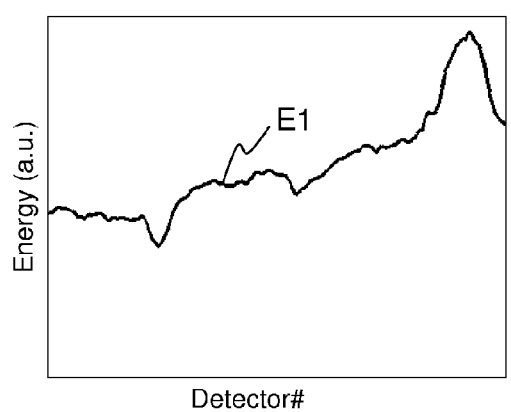
Figure 19B:
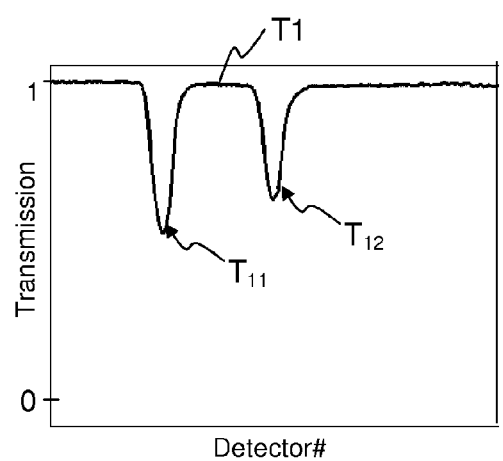

As mentioned above, if there are more than one touch point on the same light path, the total transmission signal is the product of individual transmissions of the touch points. This is true for any number of objects on any light path, provided that a remainder of the light reaches the detector. Thus, by converting the emitter signals into transmission signals, it is possible to separate the contribution from individual touching objects to a transmission signal value. FIG. 19A corresponds to FIG. 18A, but shows emitter signals E1 obtained with three touching objects, where two touching objects interact with essentially the same light paths. FIG. 19B shows that the resulting transmission signal T1 is made up of two peaks $T_{11}$ and $T_{12}$, wherein the magnitude of each transmission signal value within the peak $T_{11}$ represents the product of the transmissions of two touching objects along the respective light path.

The skilled person realizes that the position determination may be simplified by operating on logarithms (in any base), since the logarithm of the total transmission signal $T_{1,J}$ along a light path $S_v$ is then equal to the sum of the logarithms of the individual transmissions $t_n$ of the touch points $p_n$ on that light path: $\log T_{t,J} = \Sigma \log t_n$. Furthermore, the logarithm of the total transmission signal may be calculated by subtracting a logarithmic background value from the logarithm of the emitter signal: $\log T_{t,J} = \log(E) - \log(REF)$. In the context of the present application such a subtraction is regarded as a division operation. However, logarithms need not be used in the determination of touch locations.

In step 23, touch locations are determined based on the identified light paths.

If the light is propagated above the touch surface or inside a panel, touch locations may be determined by determining intersections between the identified light paths, i.e. triangulation.

If the light is propagated inside a panel, touch locations may alternatively be determined using the collection of identified light paths and the corresponding transmission signals. For example, the touch-sensing system may be modelled using known algorithms developed for transmission tomography with a fan beam geometry. Thus, the touch locations may be reconstructed using any available image reconstruction algorithm, which is operated on the transmission signals for the collection of light paths. The image reconstruction algorithm results in a two-dimensional distribution of transmission values (or equivalently, attenuation values) within the touch surface. The skilled person realizes that the use of an image reconstruction algorithm, compared to triangulation, may enable position determination irrespective of the shape of the touching object(s). It may also improve the ability to discriminate between multiple touching objects, and facilitate determination of other touch data such as the shape and/or size of the touching object(s).

Tomographic reconstruction, which is well-known per se, is based on the mathematics describing the Radon transform and it's inverse. The general concept of tomography is to do imaging of a medium by measuring line integrals through the medium for a large set of angles and positions. The line integrals are measured through the image plane. To find the inverse, i.e. the original image, many algorithms uses the co-called Projection Slice theorem. This theorem states that a 1-dimensional slice through the origin of the 2-dimensional Fourier transform of the medium is mathematically equal to the 1-dimensional Fourier transform of the projected line integrals for that particular angle. Several efficient algorithms have been developed for tomographic reconstruction, e.g. Filtered Back Projection, FFT-based algorithms, ART (Algebraic Reconstruction Technique), SART (Simultaneous Algebraic Reconstruction Technique), etc. More information about the specific implementations of the algorithms can be found in the literature, e.g. in the book "The Mathematics of Computerized Tomography" by Frank Natterer.

It is to be understood that step 22 may be included in step 23, e.g by operating the image reconstruction algorithm on all available transmission signals. In such an embodiment, the light paths that are affected by touching objects are inherently identified when the algorithm processes the transmission signals.

The accuracy and/or computation speed of step 23 may be increased by using a priori knowledge about the touch locations, e.g. by using information about the touch locations that were identified during preceding sensing instance(s).

In step 24, the determined touch locations are output and the method returns to step 20 for processing of a forthcoming sensing instance.

The data processing may also involve determining other touch data such as the shape and/or size of the touching object(s), e.g. using the algorithms disclosed in aforesaid WO2006/095320, which is incorporated herein by reference.

General

The touch surface 1 can have any shape, e.g. polygonal, elliptic or circular.

The emitter 2 can be any suitable light source, such as an LED (light-emitting diode), an incandescent lamp, a halogen lamp, a diode laser, a VCSEL (vertical-cavity surface-emitting laser), etc. All beams may be generated with identical wavelength. Alternatively, some or all beams may be generated in different wavelength ranges, permitting differentiation between the beams based on wavelength. The emitters 2 may generate diverging or collimated beams.

The energy of the beams may be measured by any type of radiation detector 4 capable of converting radiation into an electrical signal. For example, the detectors 4 may be simple 0-dimensional detectors, but alternatively they may be 1-dimensional or 2-dimensional detectors.

The above-described panel 8 may be made of any solid material (or combination of materials) that transmits a sufficient amount of light in the relevant wavelength range to permit a sensible measurement of transmitted energy. Such material includes glass, poly(methyl methacrylate) (PMMA) and polycarbonates (PC).

The processing element 5 and the control unit 3 may be implemented by program instructions executed by a processor. The processor may be a commercially available microprocessor such as a CPU ("Central Processing Unit"), a DSP ("Digital Signal Processor") or some other programmable logical device, such as an FPGA ("Field Programmable Gate Array"). Alternatively, the processing element or the control unit may be implemented by dedicated circuitry, such as an ASIC ("Application-Specific Integrated Circuit"), discrete analog and digital components, or some combination of the above. It should be noted that the control unit 3 and the processing element 5 may be implemented by processes in one and the same device.

The invention has mainly been described above with reference to a few embodiments. However, as is readily appreciated by a person skilled in the art, other embodiments than the ones disclosed above are equally possible within the scope of the invention. The different features of the invention could be combined in other combinations than those described. The scope of the invention is defined and limited only by the appended patent claims.

For example, the above-mentioned linearly independent codes may have any length. Thus, the resulting multiplexing matrix need not be square (i.e. have equal number of rows and columns). Instead, the linearly independent codes may define an overdetermined system of linear equations, which means that the multiplexing matrix is non-square, and therefore cannot be inverted analytically. However, it is still possible to calculate an approximate inverse to such an overdetermined multiplexing matrix, e.g. by deriving and solving the corresponding normal equations, as is well-known for the person skilled in linear algebra and numerical methods.

The codes of the emitters may be embedded in the emitted light by any type of amplitude modulation, which is not limited to on/off-modulation. For example, any number of different code values may be coded by any different energy values of the emitted light.

Figure 20:
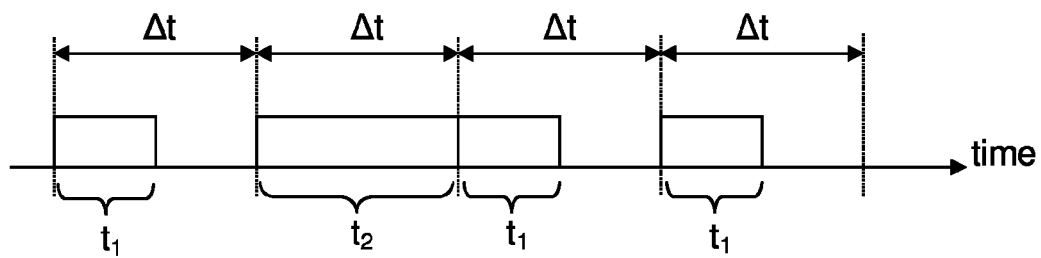
FIGS. 20-21 are timing diagrams to illustrate alternative ways of embedding codes by modulation of light.

FIG. 20 illustrates yet another type of modulation, in which different pulse lengths of the emitter are used to represent different code values of the associated code. Thus, the duty cycle of the emitter is modulated by changing the duration of the activation interval in relation of a constant time interval $\Delta T$ of the code-generation cycle. In the example of FIG. 20, the pulse length $t_1$ represent a code value 0, whereas the pulse length $t_2$ represents a code value of 1, and the resulting code is 0100.

Figure 21:
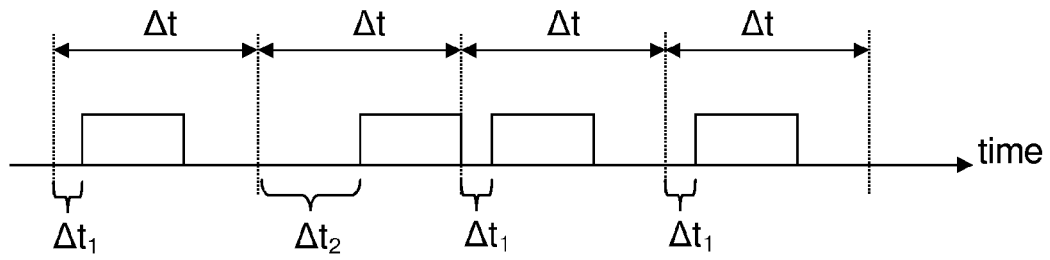

FIG. 21 illustrates yet another type of modulation, in which delays for the activation of the emitter are used to represent different code values of the associated code. Thus, the emitted light is modulated by changing the pulse delays within a constant time interval $\Delta T$ of the code-generation cycle. In the example of FIG. 21, the pulse delay $\Delta t_1$ represents a code value 0, whereas the pulse delay $\Delta t_2$ represents a code value of 1, and the resulting code is 0100.

It is also possible to combine any of the above modulations for embedding the codes in the emitted light.

In another variant, the codes are embedded in the emitted light by modulating the amplitude of the emitted light according to different functions, which are selected such that a value of an autocorrelation of each function is significantly higher than a value of a cross-correlation between any two functions of different emitters. In one such example, the different functions are given by different modulation frequencies $\omega_k$ of a basic periodic function (carrier wave). Preferably, the basic function has a well-defined frequency spectrum around its modulation frequency. The basic function may, e.g, be a cosine or sine function, such as:

$$e_k = E_k \cdot \frac{1 - \cos(\omega_k \cdot t)}{2}.$$

This means that the functions (codes) of the different emitters are orthogonal, since:

$$\frac{1}{T} \int_0^T \cos(\omega_k \cdot t) \cdot \cos(\omega_i \cdot t) dt = \begin{cases} \pi, & i = k \\ 0, & i \neq k \end{cases}$$

Like in the embodiments described in the foregoing, each detector generates a measurement signal, which is a time-resolved representation of the light received along a set of light paths, i.e. from different emitters. There are different approaches for separating such a measurement signal into a set of emitter signals. The code-generation cycle is generally selected to comprise at least one period of the lowest modulation frequency.

Figure 22:
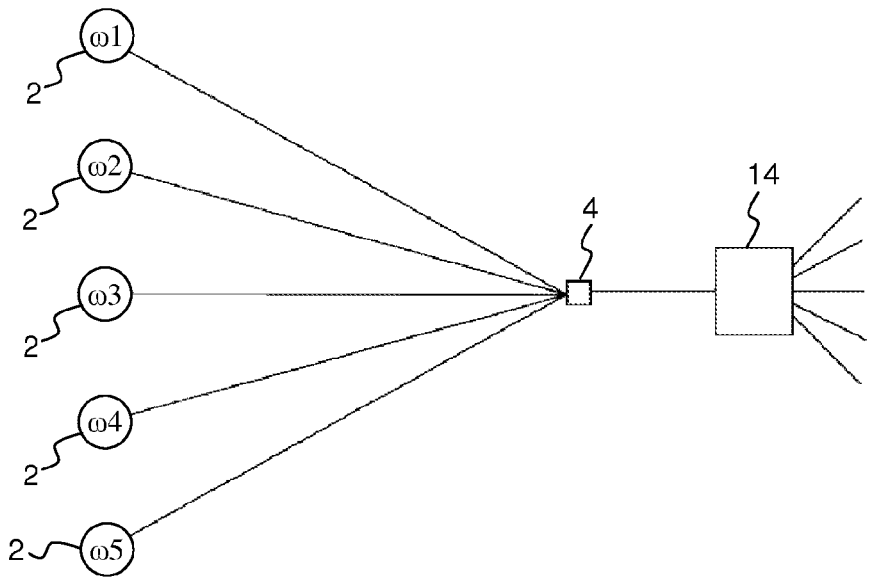
FIGS. 22-23 are top plan views of different embodiments using frequency modulation for embedding codes.

In one approach, the measurement signal is processed by a frequency spectrum analyser to identify the light energy received from the different emitters. Such an approach is further exemplified in FIG. 22, which shows five emitters 2 that are all amplitude-modulated by a cosine function, but at separate frequencies $\omega_1$-$\omega_5$. A detector 4 receives the light from the emitters 2. The detector 4 is sampled at a frequency that is at least twice the highest coding frequency, i.e. according to the Nyquist sampling theorem, to generate a measurement signal. The measurement signal is processed by a frequency spectrum analyser 14 to generate a power spectrum, e.g. by calculating the Fourier transform of the measurement signal, e.g. using a FFT (Fast Fourier Transform) algorithm. A value of the light energy received from each emitter 2 is then given by the intensity of the power spectrum at the respective frequency. In this coding scheme, it may be advantageous to choose modulation frequencies $\omega_1$-$\omega_5$ that correspond to actual frequencies that the FFT will measure, such that the frequencies are given by $\omega_k = 2\omega n/N$, with n=[1, total number of emitters] and N being the total number of sampling points during a code-generation cycle. The frequency spectrum analyser 14 may be implemented as part of the processing element 5 or may be a separate unit.

Figure 23:
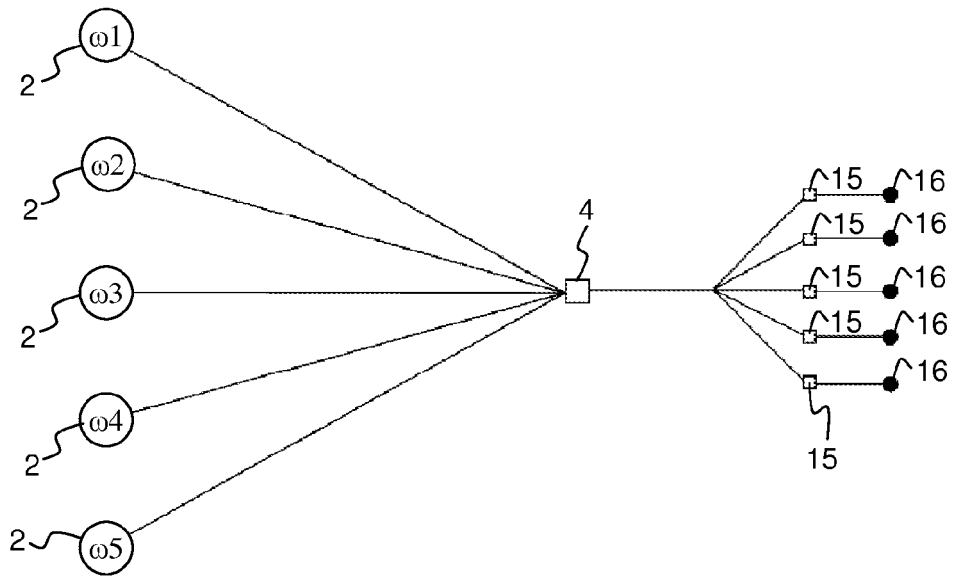

In a second approach, the measurement signal is passed through a set of bandpass filters, each adapted to the frequency of a respective emitter. Such an approach is further exemplified in FIG. 23. Like in the embodiment of FIG. 22, a detector 4 is sampled to generate a measurement signal representing the received light from five emitters 2. A set of bandpass filters 15 are arranged to operate on the measurement signal, such that each bandpass filter removes frequencies outside a passband around the modulation frequency $\omega_1$-$\omega_5$ of the respective emitter 2. The output signal of each bandpass filter 15 will represent the light energy received from the respective emitter 2. The output signal is then passed to an amplitude detector or an integrator 16, which provides an emitter signal representative of the light energy. The bandpass filters 15 and amplitude detector/integrator 16 may be implemented by digital signal processing in the processing element 5, or by dedicated electronic circuitry that operates on analog measurement signals from the detector. The processing of analog signals obviates the need for sampling, and may thus enable the use of higher modulation frequencies. The use of higher frequencies may enable shorter code-generation cycles or increased SNR.

The use of frequency modulation has the additional advantage that any signal interference from ambient light or other noise sources may be removed, provided that the modulation frequencies are well-separated from the frequencies of such noise sources.

In yet another variant, the codes are embedded in the emitted light by phase modulation, such that different code values are represented by different phase shifts of a carrier wave, which may be any suitable waveform, including cosine/sine, square, triangle, sawtooth, etc.

In one embodiment, all emitters emit light modulated by a common carrier wave at a common frequency ω, and the phases of the group of emitters are modulated according to a multiplexing scheme. In the following example, the multiplexing scheme uses the code values −1 and 1, wherein −1 is given by a 180° phase shift of the carrier wave. Thus, the phase modulation is so-called BPSK (Binary Phase Shift Keying). The light emitted from an emitter eu during a time interval i of a code-generation cycle may thus be given by:

$$e_{k,i} = E_k \cdot (1 + m_{k,i} \cdot \cos(\cap \cdot t))/2,$$

with $m_{k,i}$ being the code value of the emitter $e_k$ at time interval i. Thus, the code for each emitter is given by a vector $m_k$ consisting of the code values $m_{k,i}$. As explained above, a multiplexing matrix M may be formed by the vectors $m_k$ for N emitters: $M = [m_1\ m_2\ \ldots\ m_N]$, and the codes of the different emitters may be linearly independent, or even orthogonal. In this example, the multiplexing matrix can be a Hadamard matrix, as described above.

The detected signal $\eta_i$ at a detector during a time interval is the sum of light that reaches the detector. The light is de-modulated by multiplication with a reference signal, typically the original carrier wave:

$$\eta_i = \frac{1}{T} \int_t^{t+T} \left( \sum_k e_k \right) \cdot \cos(\omega \cdot t) dt =$$

$$\frac{1}{2T} \int_t^{t+T} \sum_k E_k \cdot \cos(\omega \cdot t) + E_k \cdot m_{k,i} \cdot \frac{1}{2}(1 + \cos(2\omega \cdot t)) dt$$

By choosing the integration time T to be an even multiple of the carrier wave frequency ω, all terms involving cos(ω·t) and cos(2ω·t) vanish. Further, the integration time is chosen to be equal to a time interval in the code-generation cycle. The de-modulation thus yields:

$$\eta_i = \frac{1}{4} \sum_k E_k \cdot m_{k,i}$$

The above multiplication and integration (de-modulation) is carried out during each of the time intervals of a code-generation cycle, resulting in a measurement signal q. As described in the foregoing, the measurement signal can be separated into a set of emitter signals, using a multiplexing inversion scheme: $\hat{E} = M^{-1} \cdot \eta$. If the codes are orthogonal, this operation may be further simplified, since $M^T = M^{-1}$ for an orthogonal (orthonormal) multiplexing matrix.

The de-modulation may be implemented by digital signal processing in the processing element, or by dedicated electronic circuitry that operates on analog measurement signals from the detector. The processing of analog signals obviates the need for sampling, and may thus enable the use of a higher modulation frequency. The use of higher frequencies may enable shorter code-generation cycles or increased SNR. The use of phase modulation has the additional advantage that any signal interference from ambient light or other noise sources may be removed, provided that the modulation frequency are well-separated from the frequencies of such noise sources.

It is to be noted that code values −1/1 is merely given as an example, and that any type of code values can be embedded in the emitted light using the phase modulation. Further, other types of phase-modulation techniques can be used, including but not limited to MSK (Minimum Shift Keying), Quadrature Phase-Shift Keying (QPSK) and Differential Phase-Shift Keying (DPSK).

The skilled person also realizes that certain embodiments/features are applicable for any type of emitter activation scheme, including operating the touch sensing apparatus without coding of the emitted light, e.g. by activating the emitters in sequence. For example, steps 22-24 of the decoding process (FIG. 17) can be used irrespective of method for obtaining the emitter signals, i.e. the received light energy on the different light paths. Likewise, the embodiments described above in the Section "Peripheral arrangements of detectors and emitters" are applicable to all types of emitter activation schemes.

The invention claimed is:

1. A touch sensing apparatus, comprising:
a light transmissive element having a touch surface;
a set of emitters arranged around a periphery of the touch surface to emit beams of light, wherein the beams of light propagate across the touch surface such that an interaction between an object touching the touch surface and the touch surface causes an attenuation of the propagating light, wherein each beam of light diverges in a plane of the touch surface as the beam of light propagates across the touch surface;
a set of light detectors arranged around the periphery of the touch surface to receive light from the set of emitters on a plurality of light paths, wherein each light detector is arranged to receive light from more than one emitter; and
a processing element configured to
determine, based on output signals from the light detectors, a light energy value for each light path;
generate a transmission value for each light path based on the light energy value; and
operate an algorithm for transmission tomography on at least part of the generated transmission values so as to determine the position of the object on the touch surface; wherein
the algorithm for transmission tomography generates a two-dimensional model of the interaction between the object touching the touch surface and the touch surface from the at least part of the generated transmission values.

2. The touch sensing apparatus of claim 1, wherein each emitter is controlled to transmit a code by way of the emitted light such that the code identifies the respective emitter, and wherein the processing element is configured to separate, based on the output signals from the light detectors, the light received from individual emitters based on the transmitted codes.

3. The apparatus of claim 1, wherein the algorithm for transmission tomography has a fan beam geometry.

4. The apparatus of claim 1, wherein the processing element is configured to generate the transmission values by dividing the light energy value by a background value.

5. The apparatus of claim 4, wherein the background value represents an energy value for the light path without the object touching the touch surface.

6. The apparatus of claim 5, wherein the background value is pre-set, derived during a separate calibration step, or derived from one or more preceding output signals.

7. The apparatus of claim 4, wherein the processing element is configured to generate the transmission values as a logarithm of the quotient between the light energy value and the background value.

8. A method in a touch sensing apparatus, said touch sensing apparatus including a light transmissive element having a touch surface, a set of emitters arranged around a periphery of the touch surface to emit beams of light, wherein the beams of light propagate across the touch surface such that an interaction between an object touching the touch surface and the touch surface causes an attenuation of the propagating light, and wherein each beam of light diverges in a plane of the touch surface as the beam of light propagates through the light transmissive element, said touch sensing apparatus further including a set of light detectors arranged around the periphery of the touch surface to receive light from the set of emitters on a plurality of light paths, and to generate a set of output signals that represents light energy received by each detector, wherein each light detector is arranged to receive light from more than one emitter, said method comprising:

determining, based on the set of output signals, a light energy value for each light path;

generating a transmission value for each light path based on the light energy value; and operating an algorithm for transmission tomography on at least part of the generated transmission values so as determine a position of the object on the touch surface; wherein the algorithm for transmission tomography generates a two-dimensional model of the interaction between the object touching the touch surface and the touch surface from the at least part of the generated transmission values.

9. A non-transitory computer-readable medium storing processing instructions that, when executed by a processor, cause the processor to perform the method according to claim 8.

10. The method of claim 8, wherein the algorithm for transmission tomography has a fan beam geometry.

11. The method of claim 8, wherein said generating comprises:

dividing the light energy value by a background value.

12. The method of claim 11, wherein the background value represents an energy value for the light path without the object touching the touch surface.

13. The method of claim 12, wherein the background value is pre-set, derived during a separate calibration step, or derived from one or more preceding output signals.

14. The method of claim 11, wherein said generating comprises:

calculating a logarithm of the quotient between the light energy value and the background value.

15. The method of claim 8, further including controlling each emitter to transmit a code by way of the emitted light such that the code identifies the respective emitter, and wherein the determining includes separating, based on the output signals from the light detectors, the light received from individual emitters based on the transmitted codes.

* * * * *